United States Patent [19]
Dighe et al.

[11] Patent Number: 5,815,398
[45] Date of Patent: Sep. 29, 1998

[54] METHOD AND APPARATUS FOR PLACING PARTS IN A BOUNDED REGION

[75] Inventors: Rahul P. Dighe, Natick; Mark J. Jakiela, Cambridge, both of Mass.

[73] Assignee: Massachusettes Institute of Technology, Cambridge, Mass.

[21] Appl. No.: 586,377

[22] Filed: Jan. 16, 1996

[51] Int. Cl.$^6$ .................................................. G06F 19/00
[52] U.S. Cl. ............................... 364/478.05; 364/474.13; 364/148.01
[58] Field of Search ............................... 364/469, 474.34, 364/552, 167.01, 570, 470.02, 478.01–478.18, 474.13, 470.06, 488–491; 382/128, 263, 132, 145, 173, 133; 395/135, 134, 162, 133, 143; 439/843, 395; 165/153; 318/570; 414/273

[56] References Cited

U.S. PATENT DOCUMENTS

| | | | |
|---|---|---|---|
| 4,554,625 | 11/1985 | Otten .................................. | 364/474.13 |
| 4,554,635 | 11/1985 | Levine ................................. | 364/475 |
| 4,630,219 | 12/1986 | DiGiacomo .......................... | 364/488 |
| 4,758,960 | 7/1988 | Jung ..................................... | 364/470 |
| 4,941,183 | 7/1990 | Bruder et al. ........................ | 382/8 |
| 5,258,917 | 11/1993 | Bruder et al. ........................ | 364/474.13 |
| 5,262,956 | 11/1993 | Deleeuw .............................. | 364/474.13 |
| 5,363,313 | 11/1994 | Lee ....................................... | 364/491 |

OTHER PUBLICATIONS

"A Method to Improve Two–Dimensional Layout,"Antonio Albano, Revised paper presented at the European Computing Congress on Interactive Systems, London Sep. 1976, 5 pgs.

"Hybrid Approach for Optimal Nesting Using a Genetic Algorithm and a Local Minimization Algorithm,"Kikuo fujita, Shinauki Akagi, Noriyasu Hirokawa, Department of Mechanical Engineering for Industril Machinery and Systems, Osaka University, Japan 1993, pp. 1–9.

"Hybrid Genetic Algorithms for Bin–Packing and Related Problems,"Colin Reeves, School of Mathematical and Information Sciences Coventry University, UK, Annals of Operations Research, pp.1–15, date unknown.

"Packaging Different–Sized Circles Into a Rectangular Container,"John A. George, Jennifer M. George, Bruce W. Lamar, European Journal of Operational Research 84 (1995) pp. 593–712.

"Guillotineable Bin Packing: A Genetic Approach,"Berthold Kroger, European Journal of Operational Research 84 (1995) pp. 645–661.

"Automated Generation of Optimally Directed Three Dimensional Component Layouts,"Simon Szykman and Jonathan Cagan, Advances in Design Automation, vol. 1 ASME 1993, pp. 527–537.

"Automatic Marker Making"Victor Milenkivic, Karen Daniels, Zhenyu Li, Progress Report: Jul. 1, 1993–Jun. 30, 1994, pp. 1–12.

(List continued on next page.)

*Primary Examiner*—Joseph Ruggiero
*Attorney, Agent, or Firm*—Nutter, McClennen & Fish, LLP

[57] ABSTRACT

A process for placing a part in a predetermined region is described. The part is defined by a part boundary and the predetermined region is defined by a region boundary. The process includes the steps of identifying corner locations of the bounded region in which parts may be placed and minimizing waste during part placement. Waste minimization may be accomplished by placing the part in a plurality of different locations in the predetermined region and at each location identifying area elements which extend from the part boundary of the part, computing the area of each of the area elements, assigning a weight value to each of the area elements and computing a weighted sum of the area elements surrounding the part boundary in each of the locations of the predetermined region. Waste is minimized at a first one of the plurality of locations of the predetermined boundary having the lowest weighted sum.

44 Claims, 18 Drawing Sheets

OTHER PUBLICATIONS

An Octree–Based Heuristic Algorithm for 3–D Packing, Zuo Dai, Jainzhong Cha, Junliang Yuan, Advances in Design Automation (1994), DE–vol. 69–2, pp. 125–133.

"A Hybrid Approach of Heuristic and Neural Network for Packing Problems," Zuo Dai and Jianhong Cha, Advances in Design Automation (1994) DE–vol. 69–2, pp. 117–123.

"An Approach to Autonomic Spatial Nesting Problem by Vibrating Potential Method," Hiroshi Yokoi, Yukinori Kakazu, Parallel Problem Solving from Nature, 2 (1992), pp. 499–508.

"A Genetic Approach to Standard Cell Placement Using Metagenetic Paramater Optimization," Khushro Shahookar and Pinaki Mazumder, IEEE Transactions on Computer–Aided Design, vol. 9, No. 5, May, 1990, pp. 500–511.

"Nesting Two–Dimensional Shapes in Rectangular Modules," Michael Adamowicz, Antonio Albano, Jan. 1996, vol. 8, No. 1, pp. 1–7, date unknown.

"Parallel Genetic Packing of Rectangles," Berthold Kroger, Peter Schwenderling, Oliver Vomberger, pp. 160–164, date unknown.

"Algorithms for Nesting Problems," Jose Fernando C. Oliveira, Jose A. Soeiro Ferreira, pp. 256–273, date unknown.

"Bin Packing With Adaptive Search," Derek Smith, pp. 202–207, date unknown.

"Compaction of Symbolic Layout Using Genetic Algorithms," Michael P. Fourman, pp. 141–153, date unknown.

"Two–Dimensional Stock Cutting Problems and Solution Methodologies," S.C. Sarin, Journal of Engineering for Industry, pp. 1–6, date unknown.

"Optimal Blank Nesting Using Simulated Annealing," P. Jain, P. Fenyes, R. Richter, pp. 109–116, date unknown.

"Optimal Allocation of Two–Dimensional Irregular Shapes Using Heuristic Search Methods,"Antonio Albano, Giuseppe Sapuppo, IEEE Transactions on Systems, Man, Cybernetics vol. SMC–10, No. 5, May 1980.

"Sequence Selection of Stock Sheets in Two–Dimensional Layout Problems,"Int. J. Prod. Res, 1989, vol. 27, No. 9, pp. 1553–1571.

"A Nesting Algorithm for Irregular Parts and Factors Affecting Trim Losses,"Weishuang Qu and Jerry L. Sanders, Int. J. Prod. Res. 1987, vol. 25, No. 3 pp. 381–397.

"Nesting of Irregular–Shaped Sheet–metal blanks, "Y.K.D.V. Prasad and Professor S. Somasundaram, Computer–Aided Engineering Journal, Apr. 1991, pp. 69–73.

"An Expert System for Automatic Allocation of 2D Irregular Shapes," Cai Yuzu, Liu Lujun, Wang Wei and Sun Kianwen, Expert Systems in Computer–Aided Design (1987), pp. 407–226.

"Algorithms for Nesting of Ship/Offshore Structural Plates," B.T. Cheok and A.Y.C. Nee, DE–vol. 32–2 Advances in Design Automation—vol. 2, ASME 1991.

Oliveira et al., "Algorithms . . . problems", Unknown, pp. 141–153. Date Unknown.

Yuzu et al., "An expert . . . shapes", Expert systems in computer aided design, pp. 407–422, 1987.

Prasad et al., "For the nesting . . . metal blanks", Computer aided engineering journal, pp. 69–73, Apr. 1991.

Qu et al., "Sequential selection . . . problems", Int. J. Prod. Res., pp. 1553–1571, 1989.

Albano et al., "Optimal allocation . . . search methods", IEEE Transactions on systems, pp. 242–248, May 1980.

Fourman, "Compaction . . . algorithms", Unknown, pp. 141–153, date unknown.

Cheok et al., "Algorithms . . . plates", Advances in design automation, pp. 221–226, 1991.

Sarin, "Two dimensional . . . mthodologies", Journal of engineering for industry, pp. 1–6, date unknown.

Jain et al., "Optimal blank . . . annealing", Unknown, pp. 109–116, date unknown.

Qu et al., "A nesting . . . trim losses", Int. J. Prod. Res., pp. 381–397, 1987.

Yokoi et al., "An approach . . . potential method", Parallel problem solving from nature 2, pp. 499–508, 1992.

Adamowicz et al., "Nesting . . . modules", Unknown, pp. 1–7, date unknown.

Shahookar et al., "A genetic approach . . . optimization", IEEE transactions on computer aided design, pp. 500–511, May 1990.

Albano, "A method to improve . . . layout", Paper presented at European Computing Congress, pp. 1–5, 1976.

George et al., "Packing different . . . container", European journal of operation research, pp. 593–712, 1995.

Szykman et al., "Automated generation . . . layouts", Advances in design automation, pp. 527–537, 1993.

Fujita et al., "Hybrid approach . . . algorithm", Industrial machinery and systems, pp. 1–9, 1993.

Milenkovic et al., "Automatic marker making", Progress Report, p. 1–12, 1993.

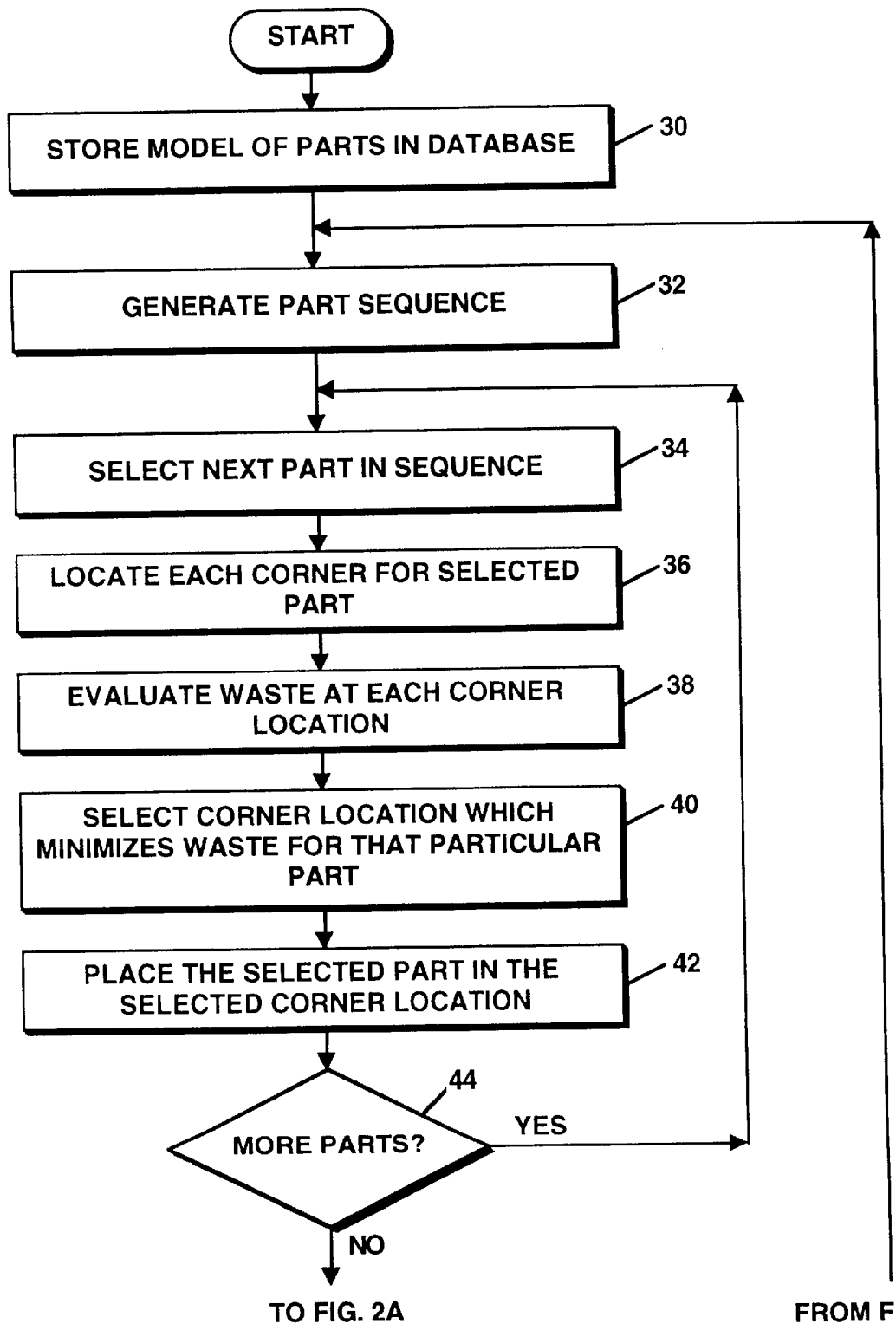
*Figure 2* (METHOD OF PLACING PARTS)

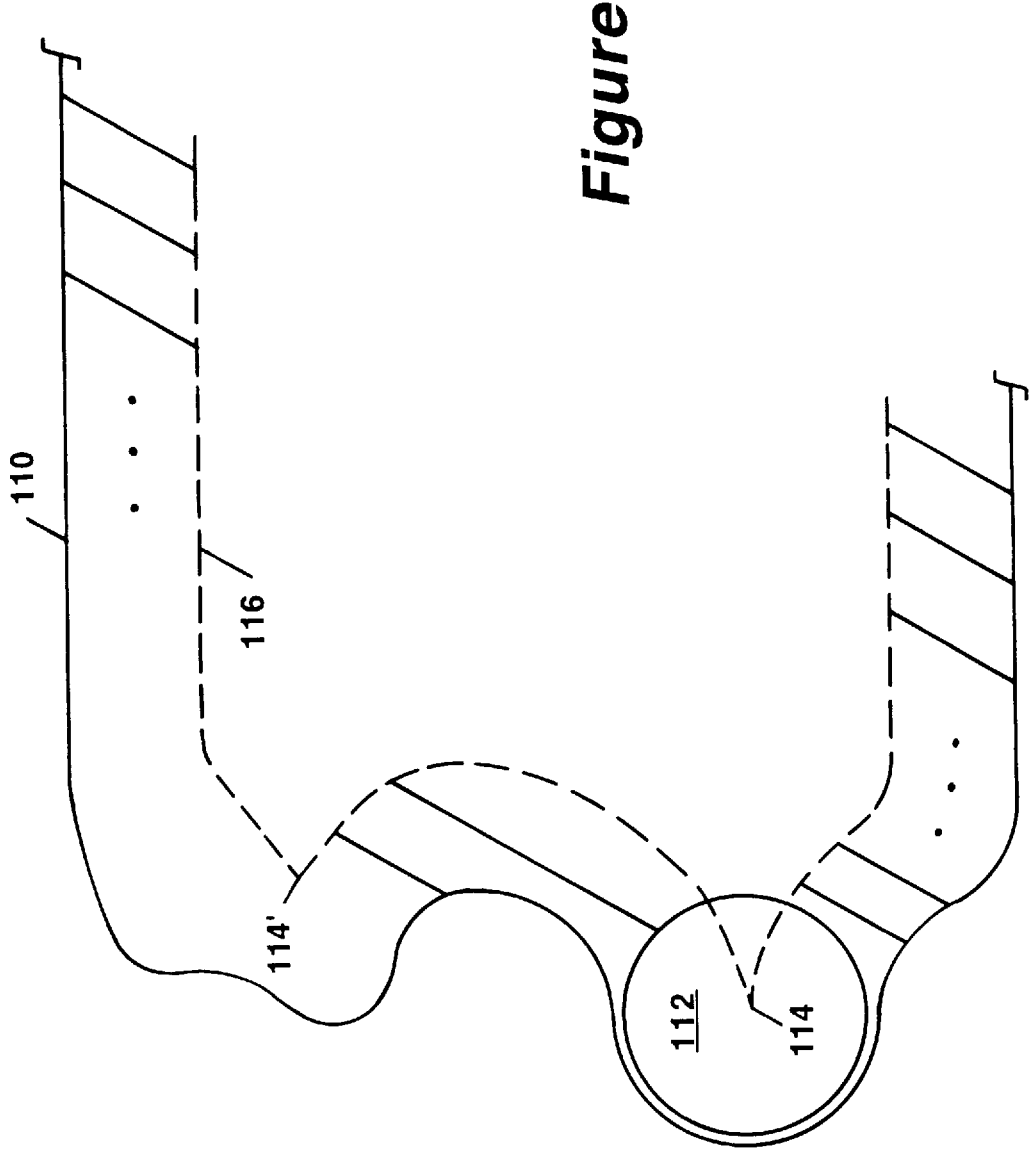

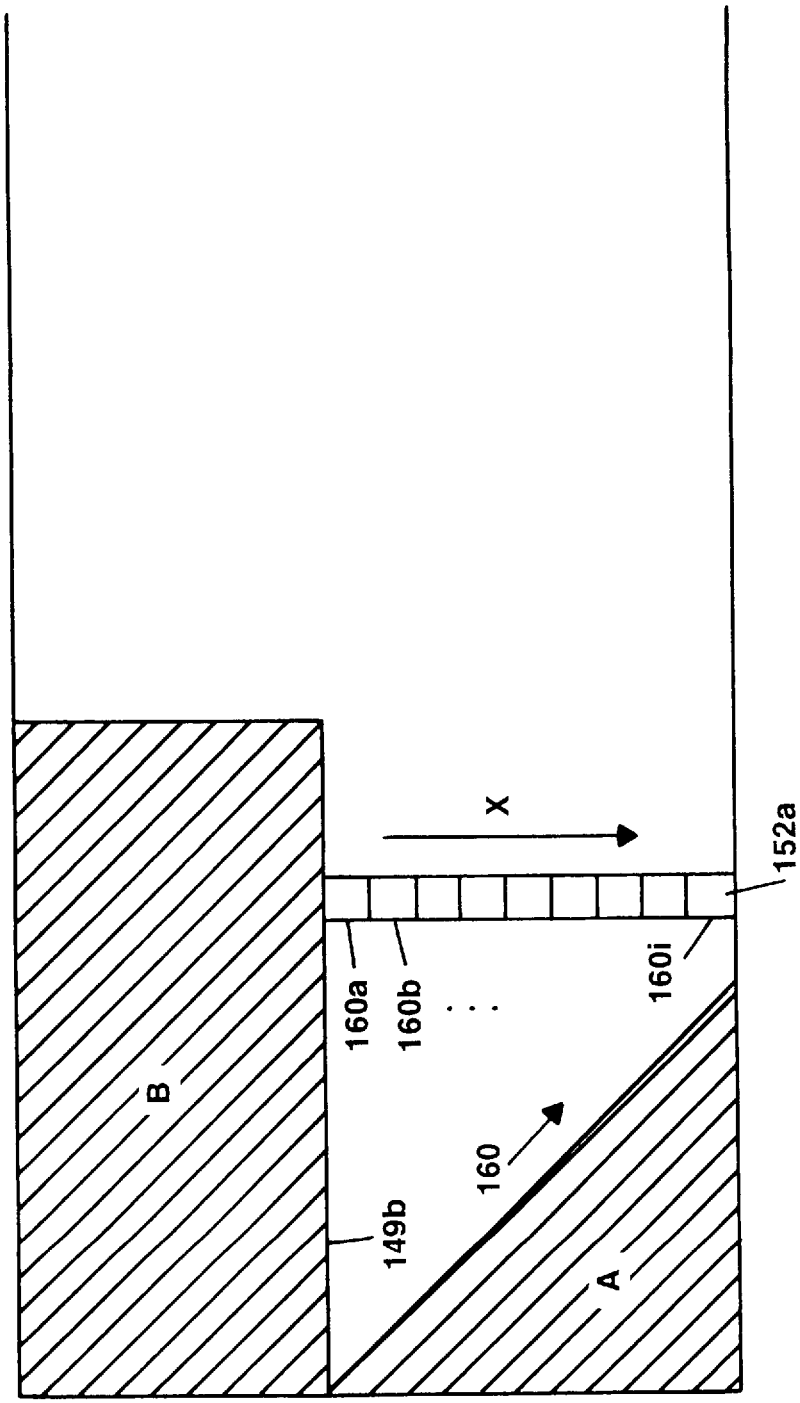

METHOD AND APPARATUS FOR PLACING PARTS IN A BOUNDED REGION

FIELD OF THE INVENTION

This invention relates generally to placement of parts in a bounded region and more particularly to automated placement of parts in a bounded region.

BACKGROUND OF THE INVENTION

As is known in the art, the term "pattern nesting" refers to the process of arranging a set of complex planar (i.e. two-dimensional) shapes in order to occupy the least amount of total space in a bounded region. The shapes are arranged in the bounded region to provide a so-called "layout." In typical pattern nesting systems, a human operator is provided with a predetermined number of two-dimensional shapes which must be placed in a bounded region having a rectangular shape. The human operator typically uses a computer having a graphical user interface to manually move images corresponding to each of the shapes within a computer generated boundary region.

The boundary region may represent a sheet of material having a rectangular shape and the object shapes may correspond to patterns which must be cut from the sheet of material. Thus, the objective is to arrange the shapes within the boundary such that a sheet of minimum length is used and such that the shapes may be cut from the sheet so that a minimum amount of waste is produced.

The human operator typically makes use of intuitive placement strategies when placing parts in a bounded region. Due to the intuitive nature of human placement strategies, it is relatively difficult for one human operator to teach another human operator how to place parts in a bounded region. Moreover, the relative skill level from one human operator to the next human operator may vary greatly resulting in wide variations in minimization of material length and minimization of material waste. Due to the lack of understanding of human pattern nesting strategies, computer automation of such human techniques has heretofore been unsatisfactory.

Computer automation of pattern nesting techniques, however, is of interest to many industries such as the garment industry, the sheet metal industry, the ship-building industry and the auto industry. It is desirable in each of these industries to efficiently utilize material from which parts are fabricated. This is particularly true when such parts are to be mass produced since one extra percent of material utilization can result in a large amount of total dollar savings. However, as described above, due to the intuitive nature of the techniques used by human pattern nesting practitioners, it is relatively difficult to provide an automated pattern nesting system.

Additional problems further complicate the development of automated pattern nesting systems. In the sheet metal, steel and garment industries, for example, predetermined part shapes are typically cut from one or more layers of material (e.g. sheet metal, steel, cloth, leather, etc . . . ) having a rectangular shape of fixed width. However, due to directional properties (e.g. warp and weave of textiles) of the material from which the part shapes are cut, the part shapes can only be arranged along relatively few of a plurality of possible rotational orientations. Thus, a problem arises in providing an automated pattern nesting system for maximizing the utilization of a sheet of material having a fixed width when a set of parts having complex two-dimensional shapes must be arranged on the sheet of material such that the length of the sheet is minimized.

Some conventional automated pattern nesting systems rely on domain specific knowledge to work well. For example, some automated systems operate by making assumptions about the shapes of parts to be placed in the bounded region. For example, in some systems all parts are assumed to have a rectangular shape or all parts are assumed to have a mirror image, etc . . . . In particular problem domains, (e.g. the shipbuilding industry domain) such assumptions may generally be correct while in other domains the same assumptions may not hold true. Thus, reliance on such domain specific knowledge restricts the use of the automated pattern nesting systems to those specific domains.

It would, therefore, be desirable to provide an automated technique which can be used to place parts having relatively complex shapes in a bounded region such that a total length of a layout is minimized and the amount of waste material is minimized and which does not rely on domain specific assumptions about the parts to be placed.

SUMMARY OF THE INVENTION

In accordance with the present invention, a process of reducing waste when placing a part in a predetermined region includes the steps of placing the part in a first location of the predetermined region, identifying area elements which extend from a boundary of the part, computing an area value for each of the area elements, and assigning a weight value to each of the area elements wherein each weight value is computed based on a distance from a predetermined point on the part or a boundary of the part to a predetermined location of the area element. With this particular technique, a method for reducing waste during the placement of parts in a bounded region is provided. After the weight values are assigned to each of the area element, a first weighted sum of area elements surrounding the part boundary in the first location of the predetermined region is computed. The part is then placed in a second different location of the predetermined region and a next set of area elements are identified, areas of the area elements are computed and a weight value is assigned to each of the area elements. A second weighted sum of the area elements surrounding the part boundary in the second different location of the predetermined region is then computed. Each of the summed weight values provides an indication of the amount of waste resultant due to the placement of a particular part in a particular location within the predetermined region. In a preferred embodiment, the lower the summed weight value, the less likely waste will occur after the part is placed in the particular location. Thus, in such an embodiment, the first and second weighted sums are compared and the part is placed in the location of the predetermined region having the lowest weighted sum. A second part is then placed in the bounded region and waste is again reduced. This technique therefore provides a method for reducing gaps between part boundaries thereby reducing the amount of waste in a layout due to unused areas or gaps between part boundaries in the layout.

In accordance with a further aspect of the present invention, a process for placing a plurality of parts in a predetermined region includes the steps of placing at least a portion of a part boundary of a first one of the plurality of parts proximate to a boundary of the predetermined region, selecting a corner location in the predetermined region and placing a second one of the plurality of parts in the corner location. With this particular technique, the number of possible part placement positions for each part is reduced from a relatively large number of possible part placement positions to a relatively small number of possible part placement positions thus facilitating automated computation of a layout by a processor, for example, in a relatively short period of time. Each of the plurality of parts are defined by corresponding part boundaries and the predetermined region is defined by the region boundary. The first one of the plurality of parts may or may not be placed in a location of the bounded region which corresponds to a corner location. The step of selecting corner locations of the bounded region may include the steps of, for each of the parts, fixing a rotational degree of freedom, identifying a center point of the part, generating a configuration space path and identifying one or more break points in the configuration space path wherein each of the one or more breakpoints in the configuration space path corresponds to a corner location for that particular part. Such a corner placement strategy is not restricted to any particular domain or application. That is, the corner placement strategy of the present invention does not require any domain specific knowledge and need not include any assumptions about the shapes of the parts to be placed or the shape of the bounded region. By limiting the placement of parts to identified corner locations, parts can only be placed in a finite number of locations. Furthermore, with this particular technique objects can be modeled as their actual shape thus allowing the objects to be packed tightly which results in a more efficient use of the bounded region. Since a finite number of locations at which parts may be placed are identified, a system which receives the benefits of modeling objects as their actual shapes and which is still relatively fast is provided. Thus, a trade off may be made between computation speed and more efficient use of space in the bounded region.

In accordance with a still further aspect of the present invention, a process for selecting an order in which to place a plurality of parts in a region having a predetermined boundary comprises the steps of computing a probability value for each of the plurality of parts wherein each probability value is proportional to a characteristic dimension of the respective part, storing each probability value in a data base and computing a first order in which to place the parts wherein the computing step uses the probability value to compute the order. With this particular technique, a process for ordering parts in a part sequence for placement in a predetermined region is provided. A set of such part orderings can be generated with this technique and used as an initial part ordering population in a so-called genetic algorithm (GA). In particular, the probability values correspond to bias values which are assigned to each of the plurality of parts such that parts having a relatively large size tend to appear at the beginning of a part sequence while parts having a relatively small size tend to appear at the end of a part sequence. This bias technique is selected to reflect a human nesting strategy of placing large parts first. Likewise, parts having a similar shape are assigned bias values such that they tend to appear adjacent or proximate each other in the part sequence. Similarly, parts having a complementary shape are assigned bias values such that they tend to appear adjacent or proximate each other in the part sequence. This results in a biasing of the plurality of parts which tends to produce a part sequence which is computed by a processor and which is similar to a part sequence which a human being would select. The process of selecting an order may further include a crossover point selection bias technique. The crossover point selection bias technique includes the steps of identifying an ideal minimum length (i.e. a length which would result in zero waste of material), measuring an actual length which results from generating a part sequence and placing parts in the bounded region in the order defined by the part sequence order and comparing the actual length to the minimum length. The greater the actual length relative the minimum length, the less optimum the part sequence. Thus, with a part sequence which results in an actual length much greater than the ideal length, the crossover point changes in a manner which tends to produce a new part sequence in which a relatively large number of the plurality of parts are placed in a position which is different from the position they held in the previous sequence. Such a crossover bias factor tends to produce part sequences which result in an optimum length part layout in a relatively short amount of time.

BRIEF DESCRIPTION OF THE DRAWINGS

The foregoing features of the invention, as well as the invention itself may be more fully understood from the following detailed description of the drawings, in which:

FIGS. 2 and 2A are a series of flow diagram of the processing which takes place when placing a part in a bounded region;

FIG. 5 is a diagram which illustrates part placement in a corner location of a bounded region;

FIGS. 7A and 7B area a series of diagrams which illustrate area elements used to compute a waste value;

DESCRIPTION OF THE PREFERRED EMBODIMENTS

Terminology

Before describing the apparatus and processes for placing parts, some introductory concepts and terminology are explained. The term "objects" or "parts" as used herein refer to an outline of a shape (i.e "a pattern") to be cut from a piece of material including but not limited to fabric, leather, sheet metal, steel, thermal insulation, closed cell or open cell foam or foam type padding etc . . . . Alternatively, an object may be an outline of a physical component (i.e. a three dimensional structure) such as an electrical circuit component, for example. Each of the parts or objects to be placed in the bounded region has a boundary which defines an outline or shape of the part.

If the object is a three dimensional structure e.g. an electrical circuit component, then the part boundary is defined in a particular plane taken through the three dimensional object. Thus, a box may have a rectangular shape, for example, while a ball may have a circular shape.

A part boundary may have a rectangular shape, a triangular shape, a circular shape or any irregular shape. For example, some part boundaries may be provided having a shape with one or more portions thereof being rectangular, triangular or circular. Thus, the terms "part" and "object" as used herein do not necessarily refer to an actual part.

Rather, the terms "part" and "object" generally refer to an image of a shape of some structure or to an image of a pattern. In the case where the part corresponds to a three dimensional structure, the shape is defined through a single plane of the part. The image may be provided as a two-dimensional array of pixels, each represented by a digital word thus allowing the "part" to be stored in a storage device such as a memory of a computer.

Figure 1:
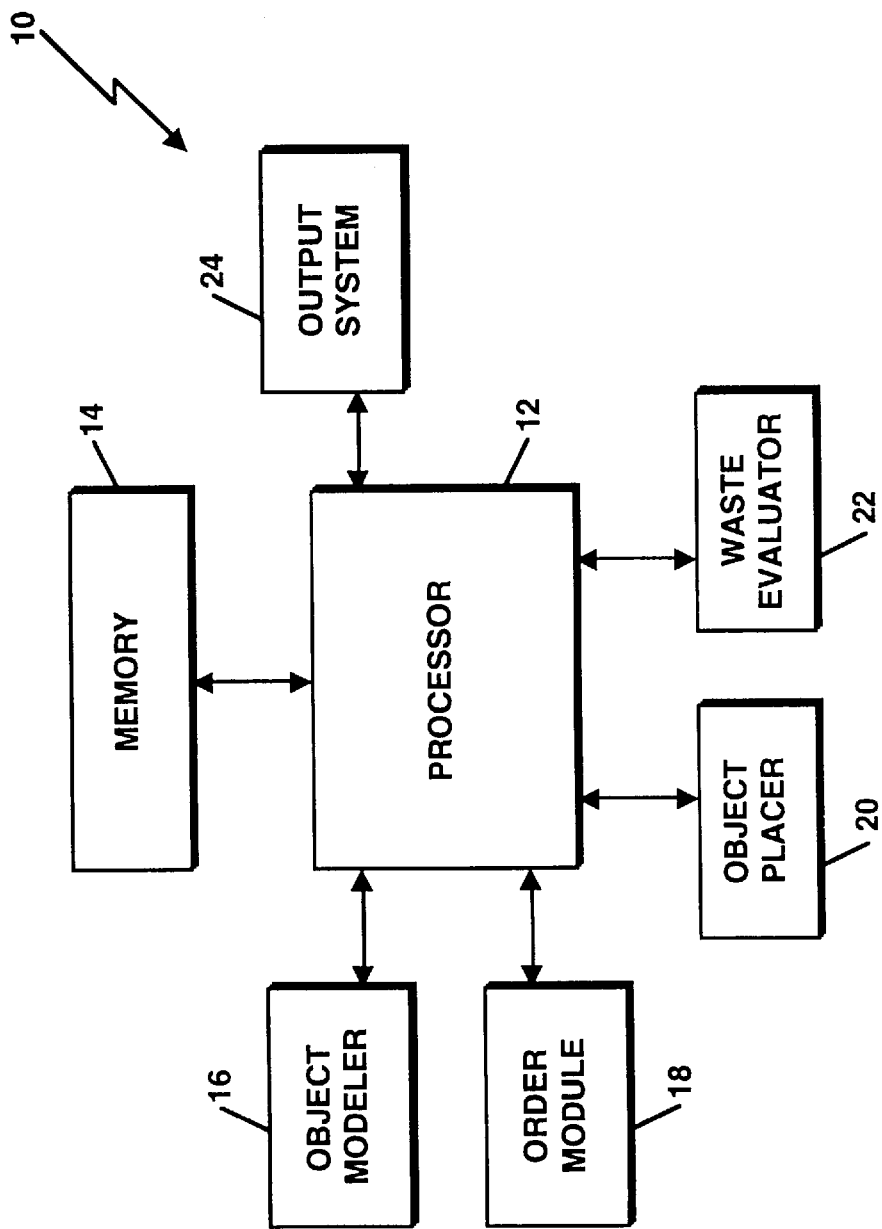
FIG. 1 is a block diagram of an automated nesting apparatus.

Referring now to FIG. 1, an apparatus 10 for arranging parts in a bounded region includes a processor 12 having a memory 14 coupled thereto. To enhance the speed at which automated layouts are produced, the processor 12 may correspond, for example, to a work station of the type identified as an Indigo$^2$ Extreme manufactured by Silicon Graphics Inc. (SGI) capable of performing computations at a computation rate of approximately one-hundred million instructions per second (mips). Those of ordinary skill in the art will recognize, of course, that any processor including those which process fewer or greater than 100 mips may also be used. For example, processors of the type commonly found in a personal computers may be used. The computing power of any particular processor which is used in accordance with the present invention will affect the overall time required to produce a part layout.

An object modeler 16 is coupled to processor 12. For each of a plurality of objects to be arranged in a bounded region, object modeler 16 generates a digitized pattern of an actual shape of the object. Such digitized patterns are stored in the memory 14 as a bit sequence. An order module 18 for placing the plurality of objects in a predetermined order or "part sequence" in which the objects will sequentially be placed in the bounded region is coupled to processor 12. Order module 18 may place the parts in a randomly selected part sequence or may place the parts in a part sequence generated by a predetermined algorithm such as a genetic algorithm as will be described below in conjunction with FIG. 3.

Once the parts have been ordered in a predetermined part sequence, an object placer 20 selects the initial part in the ordered part sequence and identifies one or more corner locations in the predetermined region for this part. Identification of corner locations will be described in detail further below in conjunction with FIGS. 3–5A. For each of the corner locations a waste evaluator 22 evaluates the waste at each corner location and identifies a corner location which minimizes the waste. The object placer 20 then places the part in the selected corner location. After the initial part is placed, the object placer 20 selects the next part in the part sequence and locates each of the corner locations for this particular part with the initial part already placed in the bounded region.

Waste evaluator 22 again evaluates the waste at each corner location and identifies a corner location at which the waste is minimized. Object placer 20 then places the second part in this location. These steps are repeated until each of the parts are placed in the region.

Once each of the parts are placed, processor 12 provides output data to an output system 24. In one embodiment, the output data may correspond to image data and output system 24 may be provided for example as a display screen on which a user of apparatus 10 may display the image data provided by processor 12.

Figure 1A:
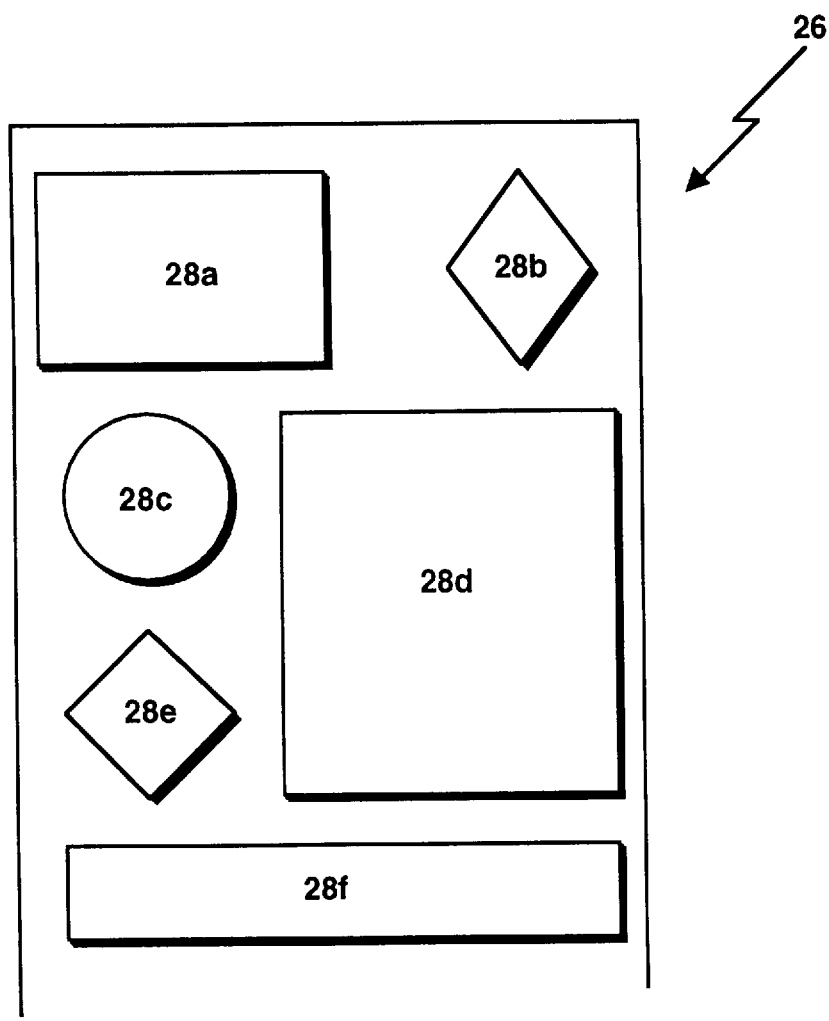
FIG. 1A is a diagrammatical view of a completed part placement layout.

Referring briefly to FIG. 1A, in the case where output system 24 is provided as a display screen, one type of output image which may be displayed on the screen is an image of a bounded region 26 having a plurality of parts 28a–28f arranged therein in a part layout.

Alternatively, output system 24 may be provided as a fabrication system such as a numerically controlled (NC) cutting machine, a drawing system such as a light pen drawing system or any other type of electrical or mechanical system well known to those of ordinary skill in the art.

Figure 2A:
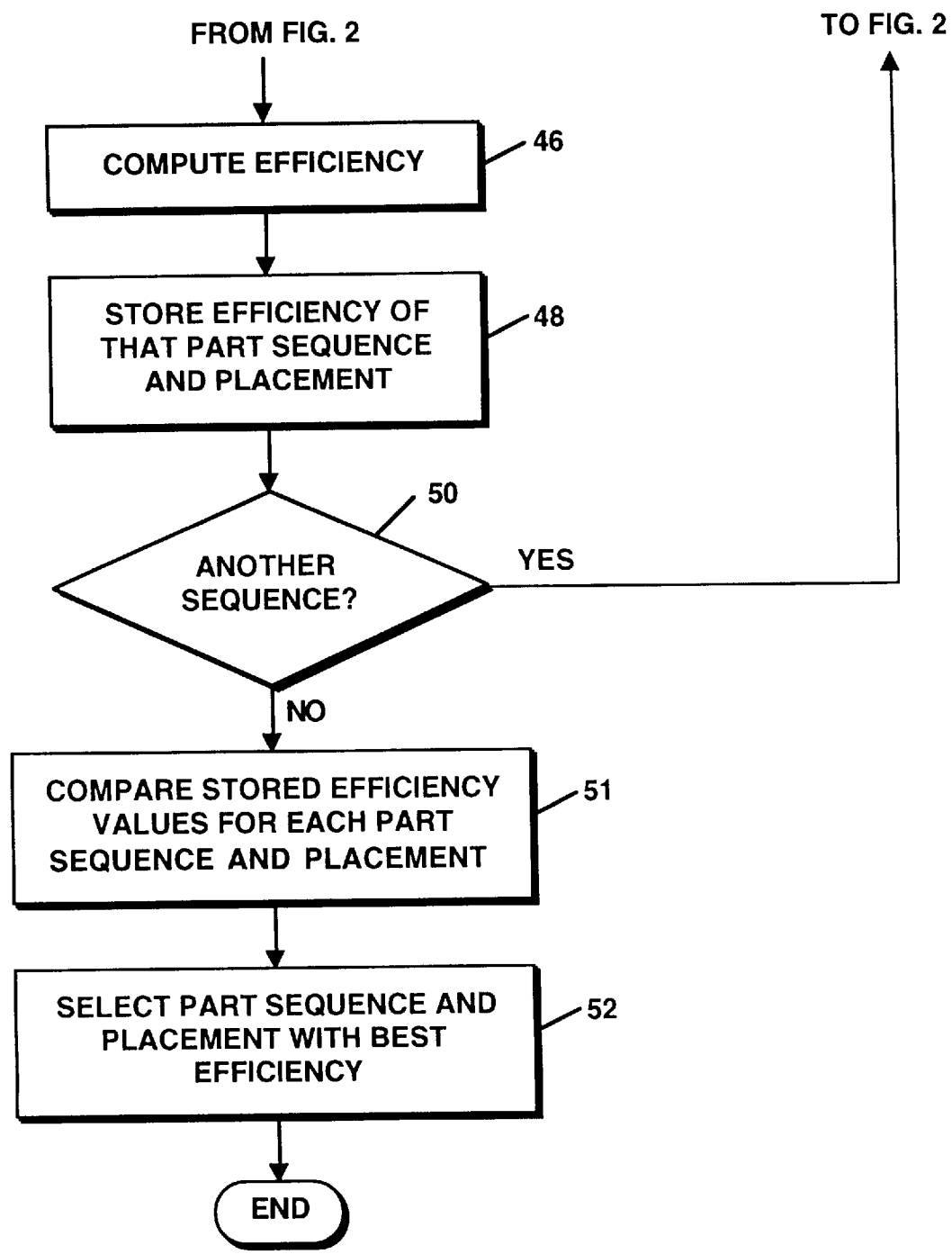

FIGS. 2 and 2A show a flow diagram of the processing performed by apparatus 10 to store parts in a bounded region. The rectangular elements (typified by element 30), herein denoted "processing blocks," represent computer software instructions or groups of instructions. The diamond shaped elements (typified by element 44), herein denoted "decision blocks," represent computer software instructions, or groups of instructions which affect the execution of the computer software instructions represented by the processing blocks. The flow diagram does not depict syntax of any particular programming language. Rather, the flow diagram illustrates the functional information one skilled in the art requires to generate computer software to perform the processing required of apparatus 10. It should be noted that many routine program elements, such as initialization of loops and variables and the use of temporary variables are not shown.

Turning now to FIGS. 2 and 2A, a method of placing parts in a bounded region includes the step of storing a digitized representation (i.e. "a model") of each of the parts in a database. In the present invention it is preferred that the digitized representations correspond to the actual shape of the corresponding part rather than an approximate shape of the part. By storing a digitized representation of the actual shapes of the objects, a more efficient use of the bounded region is possible. It is of course possible with this technique to approximate the shapes of the parts which results in a technique in which a part layout is produced relatively rapidly but which typically may provide a less efficient use of the area available in the bounded region. Thus, a tradeoff can be made between the speed with which a part layout is provided by apparatus 10 and efficiency of the layout (i.e. the amount of waste and length of the layout).

As shown in step 32, the parts are placed in a predetermined part sequence. The parts may be ordered either randomly or using an algorithm such as a genetic algorithm to generate a part sequence. One technique for selecting a part sequence will be described below in conjunction with FIG. 3.

Once the part sequence is selected, then as shown in step 34, a part in the part sequence is selected. The first time a part is selected (i.e. when the initial part is selected) the predetermined bounded region does not yet have any parts placed therein. Thus, as shown in step 36, a corner location for the selected part is identified in the bounded region.

In some instances it may be possible that more than one corner location exists. Thus, in step 36 each of the corner locations are identified and as shown in step 38 the waste which results from placement of the particular part at each corner location is determined.

Then, as shown in step 40, a corner location is selected which minimizes the waste for that particular part. The part is then placed in the selected corner location as shown in step 42. Decision block 44 implements a loop such that steps 34–42 are repeated for each of the parts. Once each of the parts has been placed in an appropriate location of the bounded region, the efficiency of the resulting layout is computed as shown in step 46 (FIG. 2A), and then, as shown in step 48, the efficiency value for that particular part sequence and placement is stored in a storage device such as memory 14 (FIG. 1).

Next, as shown in step 50, a decision is made as to whether another part sequence should be generated. Such a decision may be based on the efficiency value computed in step 46 for example. Alternatively, such a decision may be based on a time limitation (e.g. have computations been ongoing for more than one hour) or alternatively still, such decision may be based on the number of part sequences which have been used (e.g. try ten part sequences and stop).

If a decision is made to generate a new part sequence then processing returns to step 32 and a new part sequence is generated. If, in decision step 50 a decision is made not to generate another part sequence, then as shown in step 51, efficiency values stored in the memory for each part sequence and placement are compared, and as shown in step 52, the part sequence and placement with the best efficiency value is selected.

Figure 3:
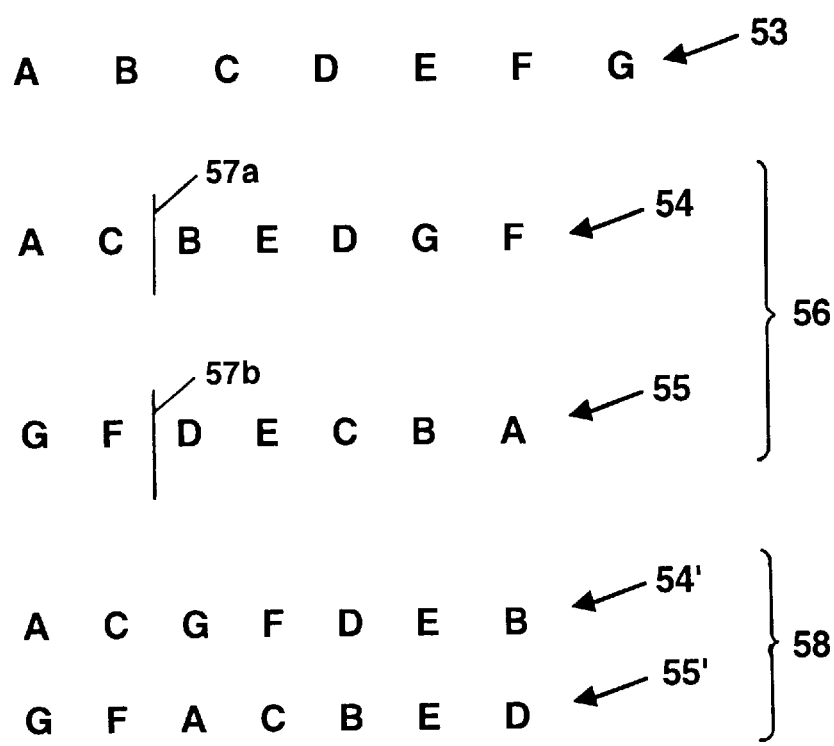
FIG. 3 is a set of parts.
Figure 3A:
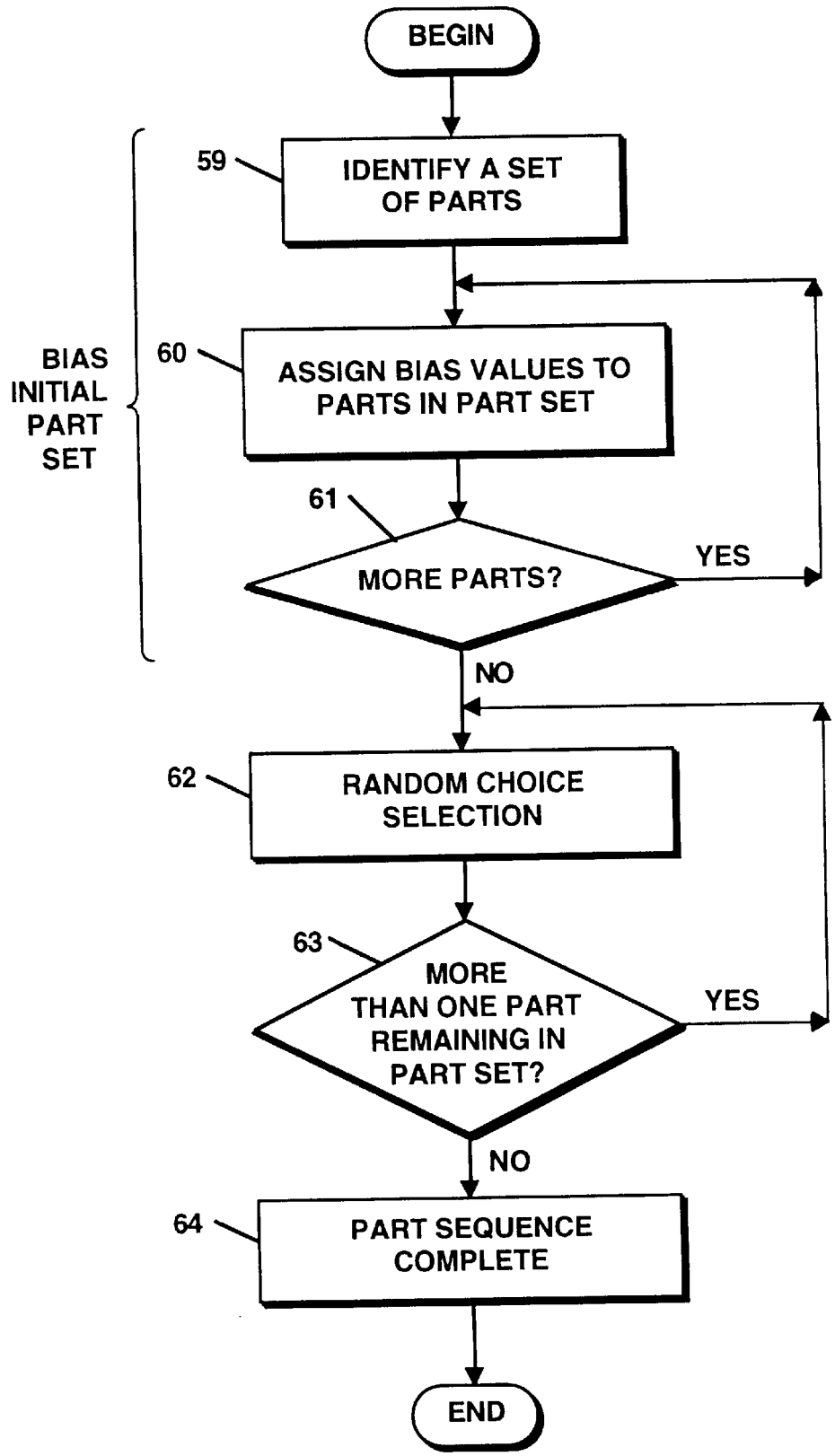
FIG. 3A is a flow diagram of the processing which takes place to generate a part sequence.

Referring now to FIGS. 3 and 3A, a modified genetic search technique is used to generate a part sequence from a plurality of parts A–G generally denoted 53. As shown in FIG. 3, the plurality of parts A–G may be arranged in a predetermined order to thus provide a first part sequence 54.

For example, a part sequence 54 may correspond to the part order A, C, B, E, D, G, F while a second part sequence 55 may correspond to the part order G, F, D, E, C, B, A. Thus when following the part sequence 54, the parts would be placed in the bounded region in the order in which they appear in the part sequence, i.e. part A placed first, part C placed second, part B placed third and so on until all the parts A–G are placed in the bounded region. Likewise, when following part sequence 55, the parts would be placed in the bounded region in the order in which they appear in part sequence 55.

In this particular application a so-called order crossover is used. As is known, an order crossover refers to selection of a crossover point in an ordered sequence and retaining one portion of the sequence and permuting the other portion of the sequence. In this particular example the left hand portion or a left hand sub-sequence of the sequence is retained and the sub-sequence to the right hand side of the cross over point is permuted in accordance with the order in which the parts appear in a mating chromosome as shown in FIG. 3.

As shown in FIG. 3, part sequences 54, 55 form mating chromosomes or parent sequences or parent chromosomes 56 from which may be generated a pair of children sequences or child chromosomes 54', 55' together denoted 58. Child sequences 54', 55' are generated in the following manner. First, crossover points 57a, 57b are selected in the respective ordered sequences 54, 55. In this particular example, crossover point 57a is selected to occur immediately after part C in sequence 54 and crossover point 57b is selected to occur immediately after part F in sequence 55. Child sequence 54' is generated by placing parts A and C in the same order in which they appear in parent sequence 54 and then selecting the order in which the remaining parts B, D, E, F and G occur in child sequence 54' in accordance with the order in which those parts appear in parent sequence 55. Similarly, child sequence 55' is generated by placing parts G and F in the same order in which they appear in parent sequence 55 and then selecting the order in which the remaining parts A, B, C, D and E occur in child sequence 55' in accordance with the order in which those parts appear in the parent sequence 54. Thus, in this particular example, a population of part sequences 54, 54', 55, 55' is provided.

Referring now to FIG. 3A, one method of generating a part sequence begins by identifying a set of parts as shown in step 59. Next, steps 60 and 61 implement a loop in which each of the plurality of parts in the set of parts is assigned a bias value. A heuristic approach can be used to assign bias values to each of the parts in the set of parts. One example of a heuristic approach is to place large parts earlier in the part sequence (i.e. place large parts first).

Rather than merely classifying each of the parts in the set of parts as either large or small, however, the bias values are generated by computing a probability value for each of the plurality of parts wherein each probability value is proportional to a characteristic dimension or an area of the respective part. It should be noted that when computing probability values for each of the plurality of parts it is possible to use a combination of probabilities computed from characteristic dimensions or areas.

Also, similar or like bias values can be assigned parts having a similar shape or shapes which are mirror images of each other such that such parts tend to appear adjacent or proximate each other in the part sequence. Similarly, parts having complementary shapes are assigned similar or like bias values such that such parts tend to appear adjacent or proximate each other in the part sequence.

After assigning a bias value to each of the parts, then steps 62 and 63 implement a random choice selection loop which is used to select parts from the biased part set thereby generating a part sequence. Once each of the parts has been selected, then as shown in step 64 a complete part sequence is provided. It should be noted that since larger parts are assigned a probability or bias value which is greater than that of smaller parts, the larger parts have a greater chance of being selected relatively early in the random choice selection process. Consequently, parts having a relatively large size tend to appear at the beginning of a part sequence while parts having a relatively small size tend to appear at the end of a part sequence.

Likewise, by assigning similar or like bias values to parts having similar shapes or shapes which are mirror images of each other, such parts tend to appear adjacent or proximate each other in the part sequence. Similarly, by assigning parts having complementary shapes similar or like bias values, such parts tend to appear adjacent or proximate each other in the part sequence.

This part set biasing technique reflects a human nesting strategy of placing large parts first and the part set biasing technique tends to produce a processor-generated part sequence which is similar to a part sequence which a human being would select.

It should be noted that different heuristics are expected to work well in different application domains. If a particular heuristic is known to work well in a particular application domain, it can be incorporated using probabilities calculated based on simple quantities and characteristics. For example, shapes of matching pieces or parts (i.e. shapes that fit well together) should preferably be assigned similar probability values to produce layouts where such pieces or parts are adjacent to each other. For example, in a layout from which a shirt is to be manufactured, it may be preferable to have patterns for a shirt collar and a shirt torso arranged adjacent or proximate each other in a layout since these portions of the shirt have boundaries with complementary shapes and thus are likely to pack tightly together. Similarly, in some applications, parts having a relatively complex shape (e.g. polygonal shapes) may preferably be placed earlier in a part sequence than parts having a relativley simple shape (e.g. a rectangular shape).

It has also been recognized that human pattern nesting practitioners tend to modify layouts based on the quality of the layout. That is, the better the layout the less modifications which are made to a part sequence while the worse the layout, the greater the modifications to a part sequence.

The crossover point selection bias technique includes the steps of identifying an ideal minimum length (i.e. a length which would result in zero waste of material), measuring an actual length which results from generating a part sequence and placing parts in the bounded region in the order defined by the part sequence order, and comparing the actual length to the ideal minimum length. The greater the actual length relative to the ideal minimum length, the poorer the part sequence. Thus, with a part sequence which results in an actual length much greater than the ideal length, the crossover point is changed in a manner which tends to produce a new part sequence in which a relatively large number of the plurality of parts are placed in a position which is different from the position they held in the previous sequence. Such a crossover bias tends to produce part sequences which result in an optimum length part layout in a relatively short amount of time.

For example referring to again to FIG. 3, assuming that part sequence 54 resulted in layout length which is relatively close to the ideal optimum layout length then a crossover point would tend to be selected toward the right hand side of part sequence 54. For example, the cross over point may be selected to occur immediately after part D. On the other hand, assume that part sequence 54 resulted in layout length which is relatively long when compared to the optimum layout length. In this case, a crossover point would tend to be selected toward the left hand side of part sequence 54. For example, the cross over point may be selected to occur immediately after part C.

The probability of the crossover point being closer to the left end of a part sequence in response to a particular part sequence providing a relatively long layout may be computed in the following manner. First, the length of the layout corresponding to the part sequence selected for crossover is known. A crossover bias factor (CBF) may be computed as:

$$CBF = L/Lm$$

in which
L=the actual length of the layout which resulted from placement of parts in a particular part sequence
Lm=a minimum possible layout length (i.e. a layout length which corresponds to 100 percent efficiency in the layout).

The probability P1 of the crossover point being placed at the leftmost end of a part sequence and the probability P2 of the crossover point being placed at the rightmost end of the sequence are related by:

$$P1 = CBF*P2$$

It should be noted that the leftmost crossover point is positioned to the right of the first part in a sequence and the rightmost crossover point is positioned to the left of the last part in the sequence.

For example, given a sequence of parts {A, B, C, D, E, F} and assuming that the CBF=1.4, then P1=1.4*P2. Bias values are then assigned as follows:
B(A)=1.4
B(B)=1.3
B(C)=1.2
B(D)=1.1
B(E)=1.0
where B(A) denotes the bias value of a crossover point selected after part A.

The corresponding probabilities are computed as:

$$P(A) = B(A)/(B(A)+B(B)+B(C)+B(D)+B(E))$$

In this particular example, the bias values are selected to decrease in a linear manner from the first part to the last part and consequently the probability of selection of the crossover point at locations between the two ends reduces in a linear manner from the leftmost to the rightmost end of the part sequence. In this manner, the selection of a crossover point can be biased, yet be probabilistic. It should be noted that the bias values could reduce in an exponential manner as well as a linear manner.

A deterministic selection of the crossover point based directly on the length of the layout can eliminate some possibly good candidate solutions. Thus, in the present invention, the selection of the parts is randomized but the probability of any one part being selected is weighted.

It has also been recognized that the best layout produced at any stage of a layout optimization process can be used as a guideline to estimate an expected length of a good layout. Such estimation is important since it is then possible to modify the criterion for selection of a corner location to account for an expected length.

Figure 3B:
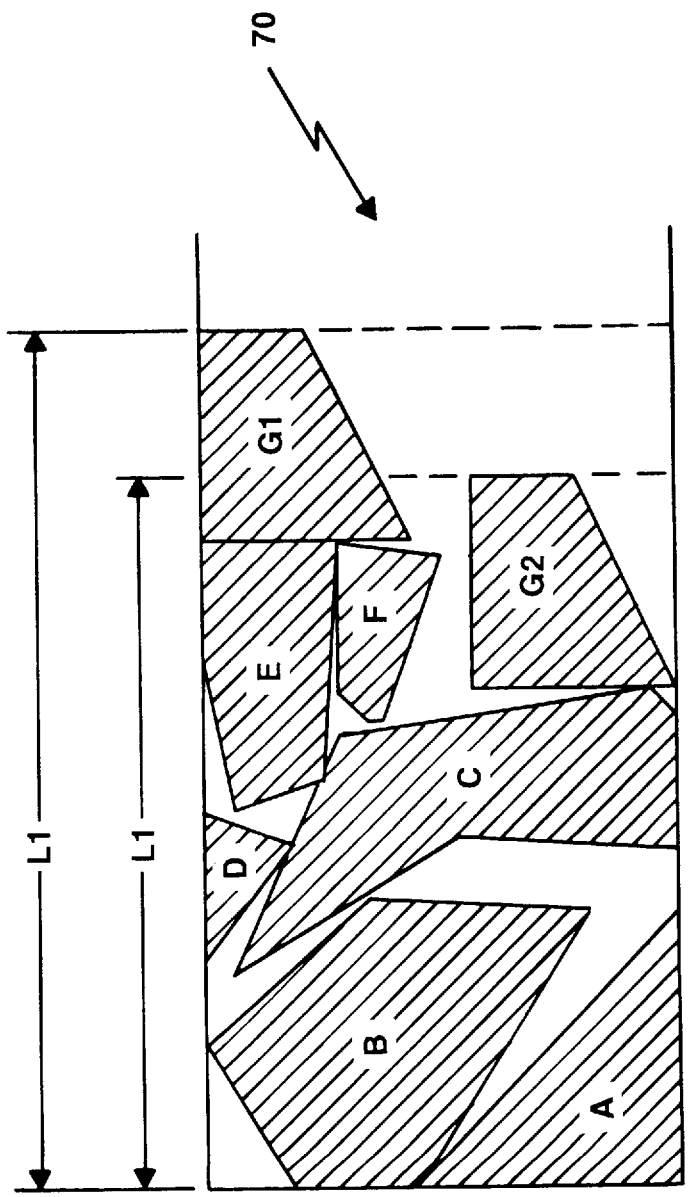
FIG. 3B is a diagram illustrating part placement minimizing layout length in a bounded region.

For example, referring now to FIG. 3B, The part G is the last part in the part sequence to be placed in bounded region 70. Location G1 creates less waste compared to location G2. However, when placing the last part it is important to minimize the layout length L1. Thus an evaluation function F having a term to account for the estimated length of the layout is used:

$$F = \text{Minimize}(Aw + P*(L-Le)/Le)$$

in which
Aw=Area waste resultant from placement of the part at a particular location
L=length of layout if the location considered is chosen
Le=estimated length of layout
P=penalty factor for exceeding the expected length=0 if L<Le This evaluation function restricts the placement of parts to the area limited by the expected length. The smallest layout length obtained up to that point in time can be used as the expected length.

Figure 4:
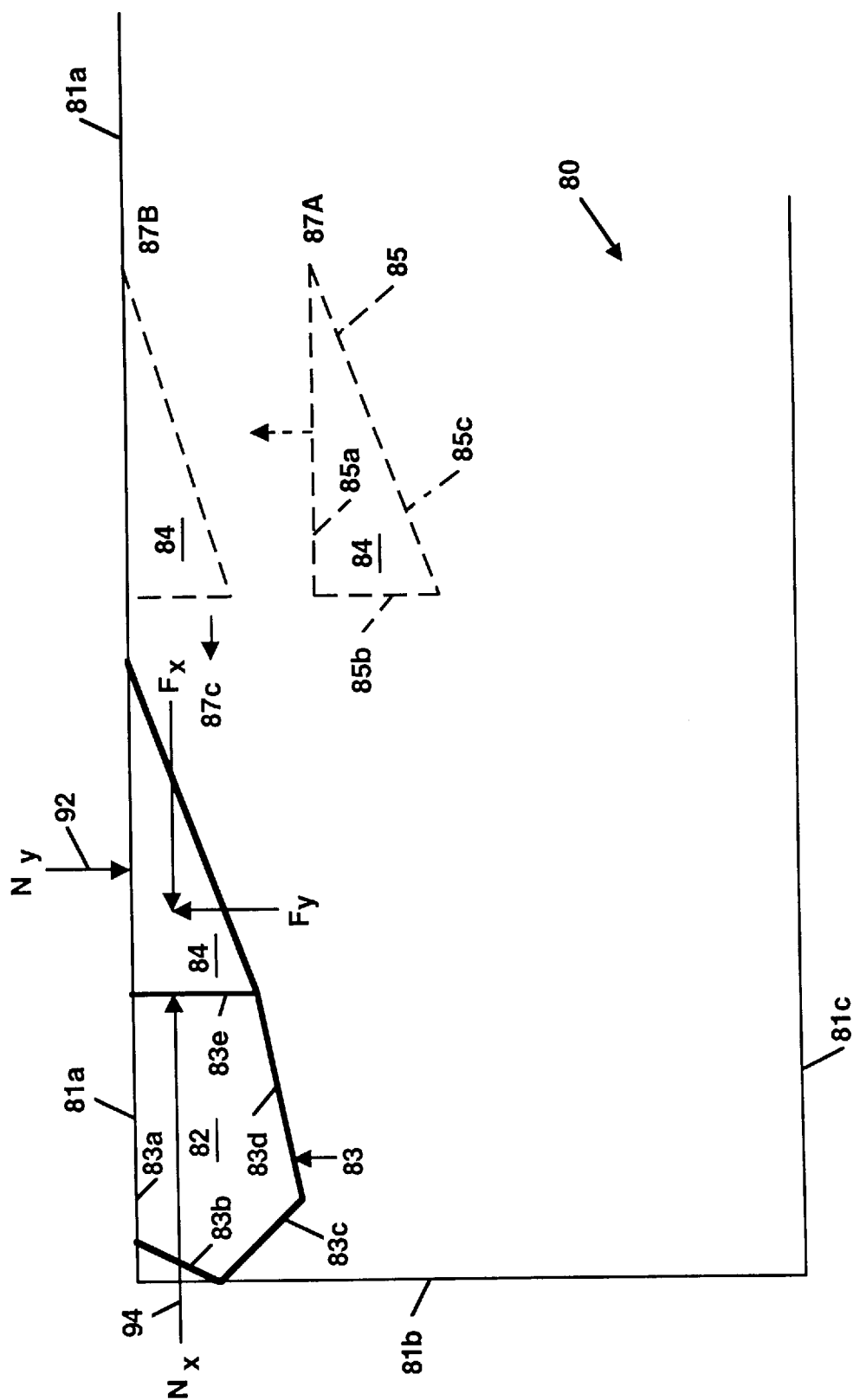
FIG. 4 is a diagram illustrating part placement in a bounded region.

Referring now to FIG. 4, a region 80 defined by a region boundary 81 having first, second and third sides 81a–81c has a first part 82 disposed in a first portion thereof as shown. The first part 82 is defined by a part boundary 83 having first, second, third, fourth and fifth sides 83a–83e. Part 82 is disposed in region 80 such that part boundary 83a contacts region boundary 81a and part boundary 83b contacts region boundary 81b.

With part 82 placed in region 80 as shown, a second part 84 defined by a part boundary 85 having first, second and third sides 85a–85c must also be placed in the region 80. In this particular example, corner locations in which part 84 may be placed can be identified by moving part 84 from position 87A in a first direction until a first part boundary, here part boundary 85a, of part 84 contacts a region boundary, here region boundary 81a, at location 87B. Thus, in this example, part 84 is moved in a first direction from position 87A to position 87B where part boundary 85a contacts region boundary 81a.

Part 84 is then moved in a second direction orthogonal to the first direction from position 87B until a second part boundary 85b contacts part boundary 83e at which time part 84 is in position 87C. With part 84 in position 87C, a pair of lines 92, 94 can be drawn along a direction which is normal to those portions of part boundaries 85a, 85b which contact some other boundary such as a region boundary. Each normal line 92, 94 represents a reduction in one degree of freedom of movement of part 84. In this particular example, only translational movement and not rotational movement of part 84 is considered. Thus, part 84 has two degrees of freedom of movement (i.e. movement in the X and Y directions) and therefore when part 84 is placed in position 87C, part 84 is fixed. That is, by insuring contact at two different sides along part boundary 85 of part 84, the two degrees of freedom available to part 84 can be eliminated.

The above may be understood by treating part 84 as if it were forced into location 87C by application of two forces $F_x$ and $F_y$ with the existing boundaries (in this particular example, region boundary 81a and part boundary 83e) providing reactive forces that balance the applied forces $F_x$ and $F_y$. It should be noted that the reactive forces must be nonparallel to balance the two nonparallel applied forces $F_x$ and $F_y$.

Since part 84 is not allowed to rotate and is only allowed translational movement, it is not necessary to consider moment imbalance about the center of mass of part 84. As a result of the rotational constraint, it is assumed that torque is provided at the center of mass of part 84 to balance any moment imbalance resultant from the application of applied forces $F_x$, $F_y$ and the reaction forces $N_x$, $N_y$ provided by the boundaries 81a, 83e. This process is one method of direct identification of corner locations in which a part can be placed.

Figure 4A:
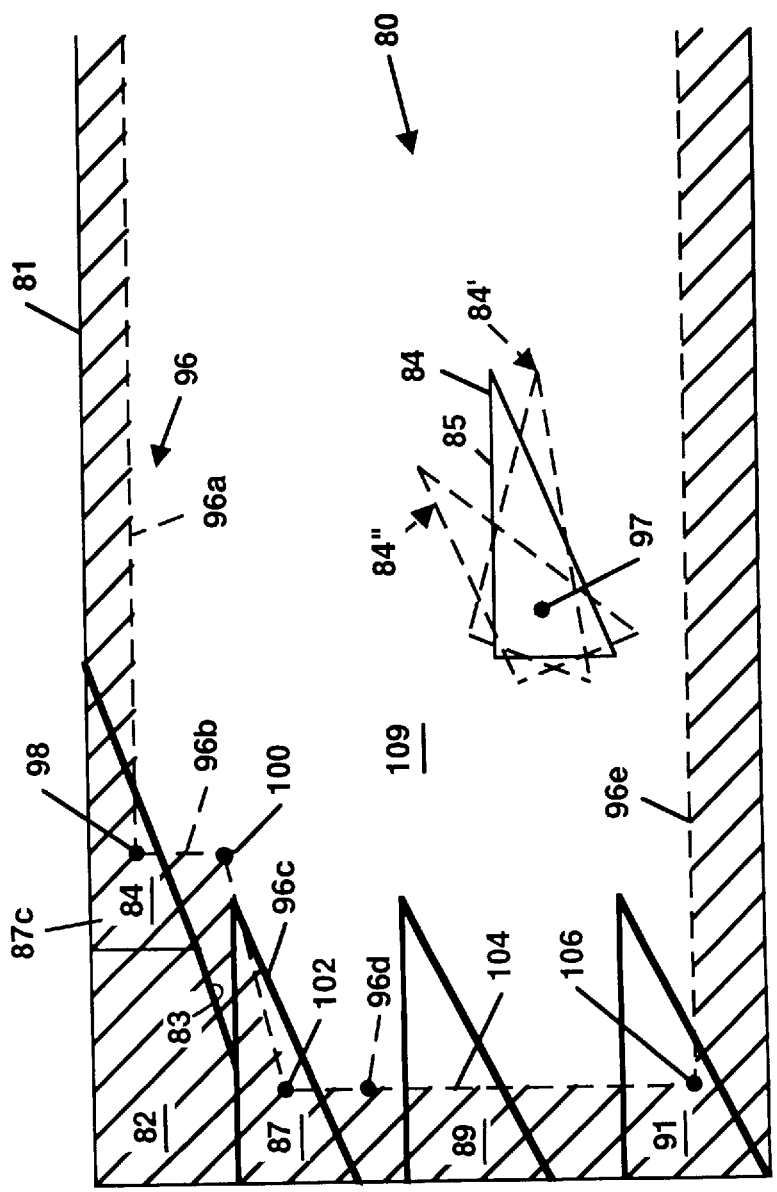
FIG. 4A is a diagram which illustrates part placement in corner locations of a bounded region.

Referring now to FIG. 4A, with part 82 placed in region 80 as shown, a preferred technique for identification of corner locations for part 84 is explained. Since part 84 can be rotated in a plurality of different positions (e.g. 84', 84" as illustrated in phantom in FIG. 4A) it is first necessary to constrain part 84 to a single orientation within region 80. Any conventional technique for selecting an orientation of a part to be placed in a bounded region may be used to constrain part 84 to a single orientation.

Once part 84 is constrained to a single orientation, a single reference point 97 of the part 84 is identified and the location of part boundaries 85a–85c are defined in terms of distances from the reference point 97. Reference point 97, may for example, correspond to a geometric center of a part, a predetermined point on an edge of a part or a corner of a part. For example, if the part has a rectangular shape then the part may be described by identifying a corner of the part as well as a length and width of the part. If the part has a circular shape, on the other hand, then the reference point may be defined as the center of the part and the part can be described by specifying a radius value.

Next, a configuration space path 96 having a plurality of segments 96a–96e is constructed within region 80. Configuration space path 96 for part 84 is defined by moving reference point 97 to those areas of region 80 where at least one part boundary of part 84 would contact but not overlap either or both of a portion of the region boundary 81 and a portion of a part boundary of another part. In this particular case, for example, configuration space path segment 96c is generated in response to a portion of part boundary 85 contacting a portion of part boundary 83. Several locations which part 84 occupy while generating configuration path 96 are designated as locations 87, 89 and 91.

Configuration space path 96 defines those areas within region 80 in which part 84 may be placed. Specifically, as indicated by the hash marks in FIG. 4A, those areas between configuration space path 96 and part or region boundaries are not available for placement of part 84 while all other areas are available for placement of part 84. It should be noted that configuration space path 96 includes a plurality of breakpoints 98, 100, 102, 106. Breakpoints 98, 100, 102, 106 occur in configuration space path 96 at those points along the configuration space path at which a straight line segment path changes direction or where a mathematical discontinuity (i.e. any point along the path where the derivative is discontinuous) in the configuration space path occurs.

To determine if any of breakpoints 98, 100, 102, 106 in configuration space path 96 correspond to corner locations of part 84 it is necessary to determine whether, in the region available to place part 84, the breakpoint defines an angle which is less than or greater than 180 degrees. For example, breakpoint 98 is formed by configuration space path segments 96a, 96b. Since the angle between these two configuration space path segments is less than 180 degrees, then breakpoint 98 corresponds to a corner location for part 84. Breakpoint 100, on the other hand, is formed by configuration space path segments 96b and 96c and the angle therebetween is greater than 180 degrees. Thus, breakpoint 100 does not correspond to a corner location for part 84.

It should be appreciated that it is possible to move part 84 to locations 98, 102, 104 or 106 as shown. It should also be noted that the locations 98, 102 and 106 correspond to corner locations of part 84 while location 104 is not a corner location. Similarly no corner locations are found in the region designated 109. Thus, in accordance with the invention, part 84 is preferably placed at one of positions 98, 102 and 106. It should also be noted that in each of corner locations 98, 102 and 106, the boundary of part 84 is in contact with at least two different portions of the existing boundaries in the layout such that lines drawn at a direction which is normal to the existing boundaries at the contact points are not parallel.

Referring now to FIG. 5, it should be noted that the parts and bounded region may have rounded shapes and need not have straight edges and that even with rounded shapes, the principles of cornering apply. For example boundary region 110 and part 112 are provided having a generally circular shape and is shown placed in one of corner locations defined by breakpoints 114, 114' of configuration space path 116.

The corner placement strategy thus provides an important simplification in that out of the infinite possible layouts the search for locations at which to place parts can be restricted to a finite number of layouts generated by considering only the corner locations while placing a single part. Thus, for N parts denoted as A, B, C . . . N, the possibilities for each part sequence can be denoted as A1, A2 . . . ; B1, B2 . . . etc. where A1 denotes part A in a first location, A2 denotes part A in a second location, etc . . . . Choosing one possibility for each part in the sequence, there are thus N! possible sequences for N parts. The number of possible layouts cannot be predicted since this number depends on the actual shapes of the parts and the corner locations generated while packing.

Figure 5A:
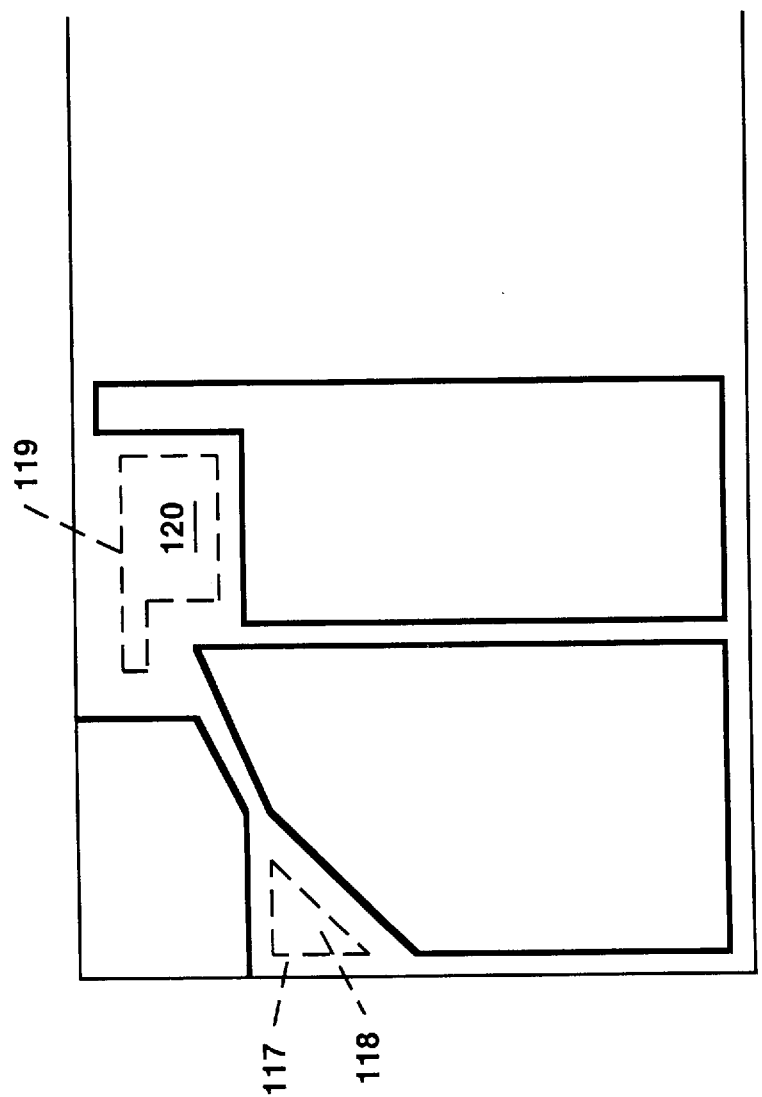
FIG. 5A is a diagram which illustrates identification of corner locations in interstitial regions of a bounded region.

Referring briefly to FIG. 5A, configuration spaces 117, 119 may also be identified for interstitial regions 118, 120 respectively. It should be noted that configuration spaces 117, 119 can only be generated with parts having a shape and size which do not result in any regions of overlap with adjacent part or region boundaries when the part is placed in a respective one of the interstitial regions 118, 120.

Figure 6:
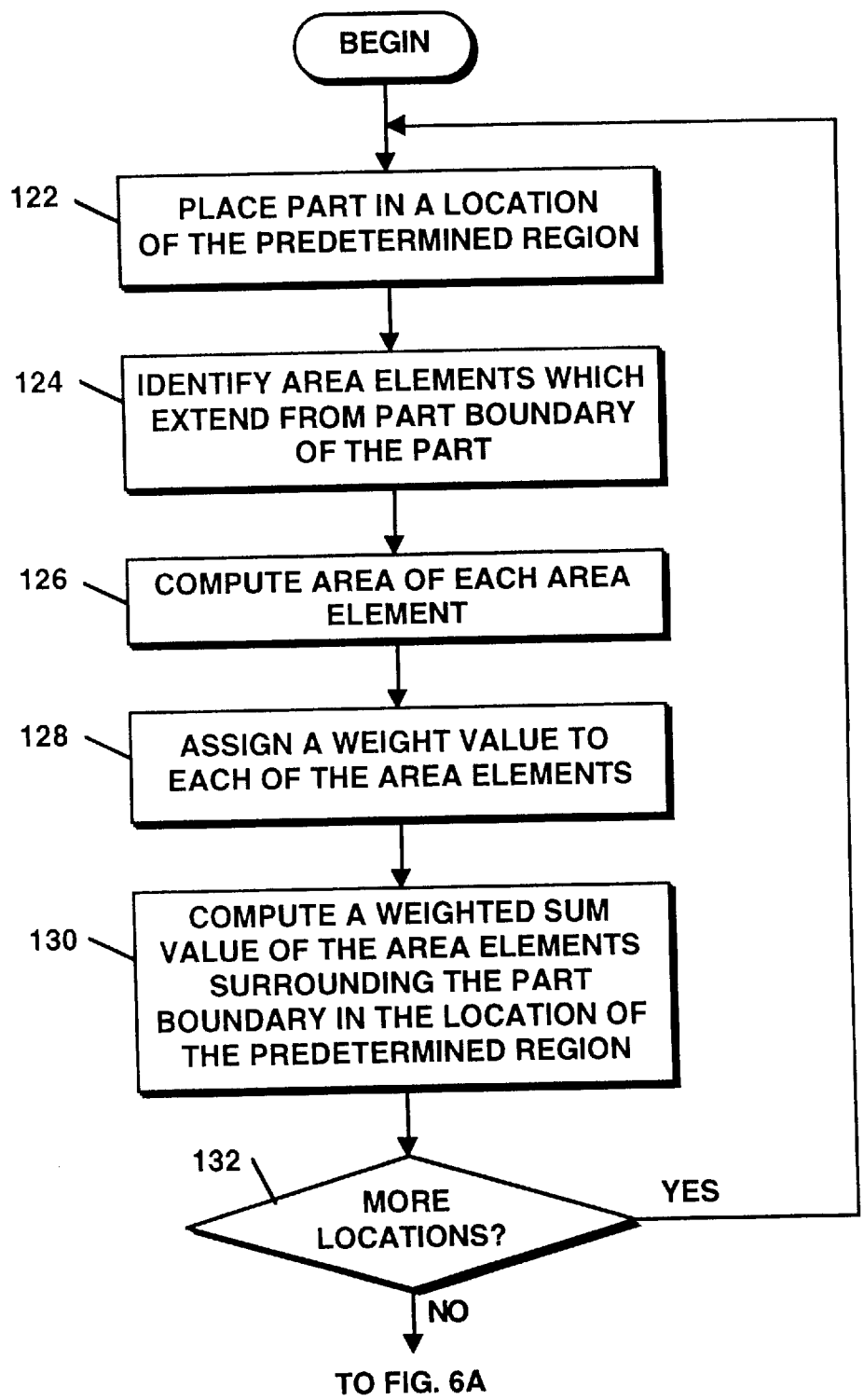
FIGS. 6 and 6A are a series of flow diagram of the processing which takes place when evaluating waste.
Figure 6A:
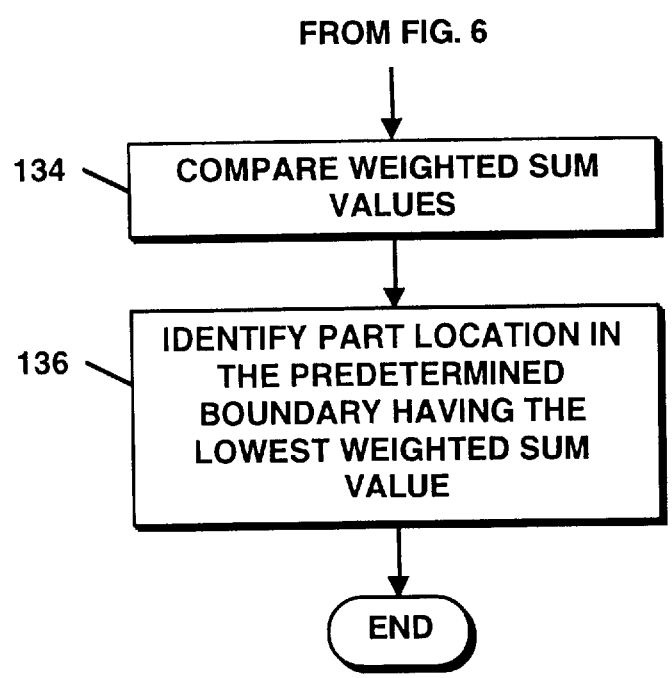

Referring now to FIG. 6, a process for evaluating waste begins after a part is placed in a location of the predetermined region as shown in step 122. Then, as shown in step 124, area elements are identified which extend from a part boundary of the part to another boundary and in step 126 the area of each area element is computed.

Next as shown in step 128 a weight value is assigned to each of the area elements and in step 130 a weighted sum value of the area elements surrounding the part boundary in the location of the predetermined region is computed. Step 132 implements a loop such that steps 122–130 are repeated for each location at which a particular part may be placed.

Once all of the locations have been considered, then as shown in step 134, a comparison is made between each of the weighted sum values computed in step 130 and in step 136 identification of the part location in the predetermined boundary having the lowest weighted sum value is made.

It should be noted that even when the corner placement strategy is used, the number of possible layouts is such that it would be prohibitively time consuming to evaluate each possible layout. Thus, out of several possible corner locations at each stage, it is useful to consider only one location.

It has been recognized that humans choose locations that reduce gaps between the boundaries in order to produce tightly packed layouts. Thus, it is desirable to provide a technique which can be used to reduce gaps between the part boundaries and minimize the waste area created in part placement.

Referring again to FIG. 4A, considering corner locations 98, 102 and 106 it typically appears to a human observer that placing a part at corner location 98 may produce a tightly packed layout. This choice is very intuitive to a human eye if the sole criteria is to place the part 84 at a location where the gaps between the part boundaries are minimized. However, such human intuition must be quantified in order to be of use in an automated nesting system.

While placing part 84 on the layout, it is important not to create gaps between boundaries that cannot be occupied by the subsequent parts to placed on the layout. The areas that cannot be accessed by the subsequent parts can be considered possible waste. A simple measure of this waste is not obvious if the shapes of the parts to be placed subsequently are not known. Thus, one measure of waste may be based on the probability of the areas being occupied later.

Figure 7:
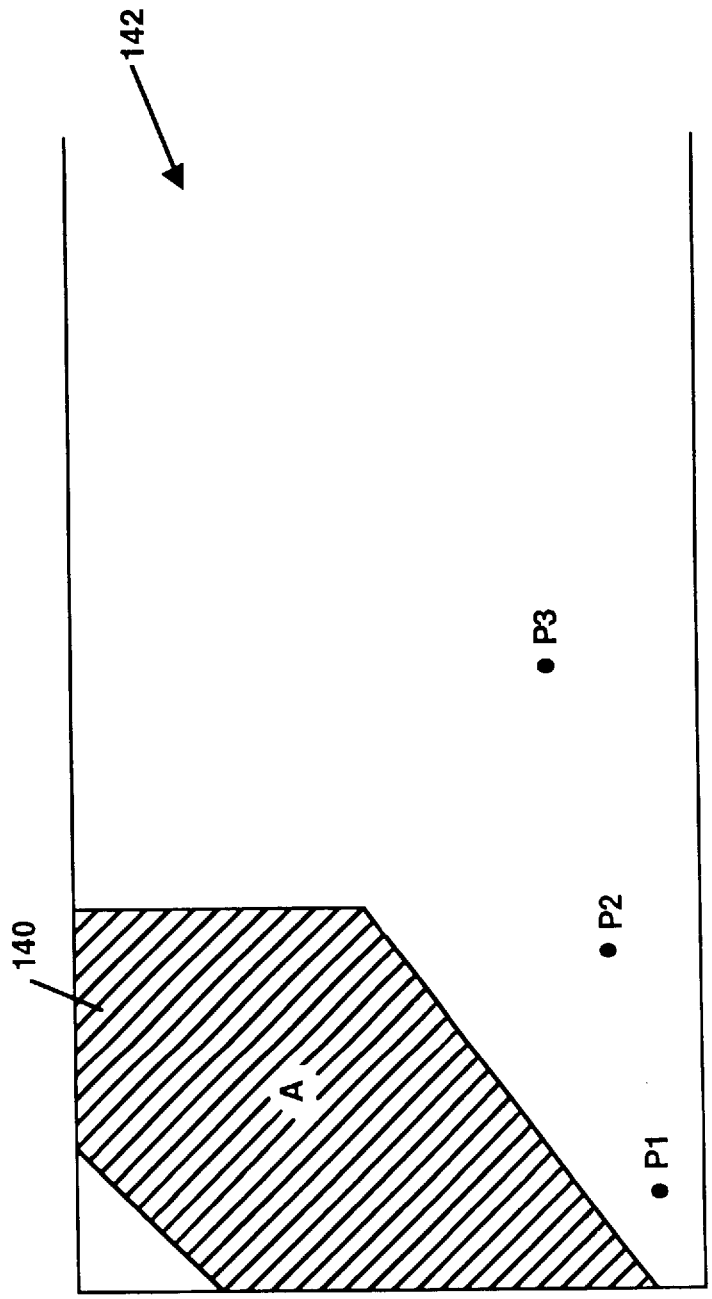
FIG. 7 is a diagram which illustrates waste in a bounded region.

Referring now to FIG. 7, a bounded region 142 having a part 140 disposed therein is shown. After placing part 140 at the location shown, the likelihood of the region around point P1 being occupied by subsequent parts in a part sequence appears to be lower than that for point P2. This could be attributed to the fact that point P1 is surrounded (although not from all sides) by part boundaries closer to it compared to point P2. If a subsequent part is to occupy the region around point P1, that part must have regions that fit between the boundaries surrounding point P1. Similar reasoning holds for point P2 and point P3. At this point in time it is not possible to make any assumptions about the sizes and shapes of the parts that are to follow. Only a reasonable estimate about which of the points is more likely to be occupied can be made.

Placement of a part at any location can be considered to affect the likelihood of the regions closer to its boundaries being occupied by subsequent parts. The regions closer to the boundary are more adversely affected. Thus, the placement of any part creates an effect of inaccessibility of areas near its boundaries in the layout.

Figure 7A:
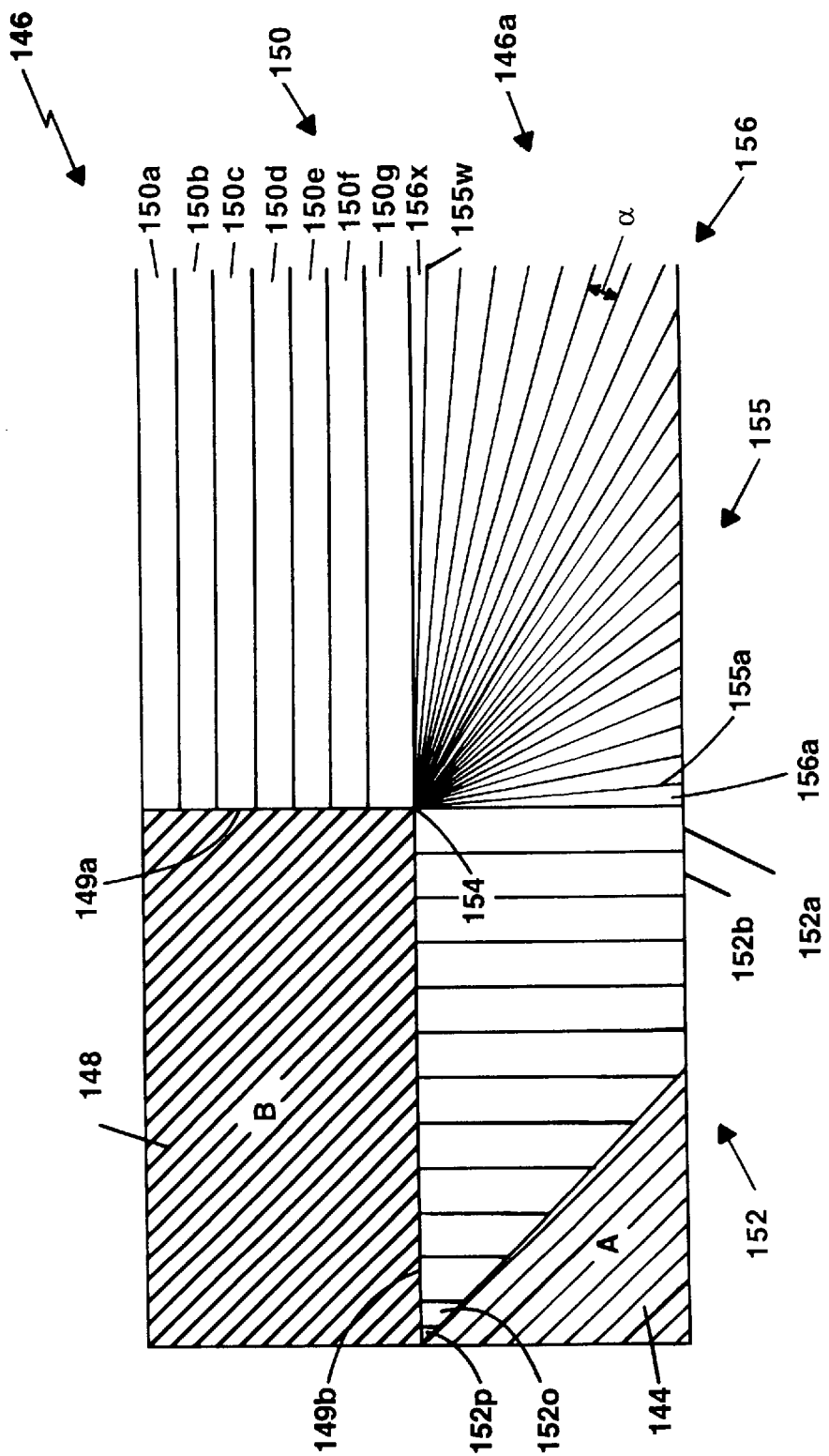

Thus, as shown in FIG. 7A an estimate of the total waste can be made by taking a weighted sum of the areas surrounding the part boundaries. In FIG. 7A, part 144 is already placed in bounded region 146 and the placement of part 148 at the location shown is considered. Moving away from the boundary 149a of part 148, area elements of equal width 150a–150g, generally denoted 150 are created until a region boundary or another part boundary is reached.

It should be noted that in those regions where no boundary is intercepted (e.g. end 146a of bounded region 146) then area elements such as area elements 150 can terminate at a location where the material from which the shapes would be cut ends. Alternatively rather than terminating the area elements, a weighting function as will be described in conjunction with FIG. 7, can be used to effectively terminate the contribution of the area elements.

Similarly moving away from the boundary 149b of part 148, area elements of equal width, generally denoted 152 are created until a region boundary or another part boundary is reached as shown. Here area elements 152a, 152b, 152o, 152p are identified.

The width of area elements 150, 152 is selected based on a characteristic part size. Typically, area elements are chosen with a dimension smaller than 1/100 of the characteristic part size to thus provide a sufficiently accurate resolution. It should be noted, however, that the area element size may be 0.1%–10% of the characteristic part size with a range of 0.5%–1.5% of the characteristic part size being preferred.

A similar process is carried out starting from vertex 154 of the part boundaries. In this particular case, rays generally denoted 155 are extended from vertex 154 to generate area elements generally denoted 156. Here, for simplicity, only rays 155a and 155w and area elements 156a and 156x are designated with reference numerals. The angle alpha between each of the rays 155 is selected to be in the range of about 0.1 degree to 10 degrees with 1.0 degree being preferred.

Referring now to FIG. 7B, area element 152d is shown segmented in a plurality of area element segments 160a–160i generally denoted 160. Each of the area element segments 160 are assigned a weight value in accordance with a waste evaluation function as will be described herein below in conjunction with FIG. 7C. The waste evaluation function is preferably selected such that area element segments 160 more distant from part boundary 149b contribute a decreasing amount to the total waste created by the placement of part B.

Figure 7C:
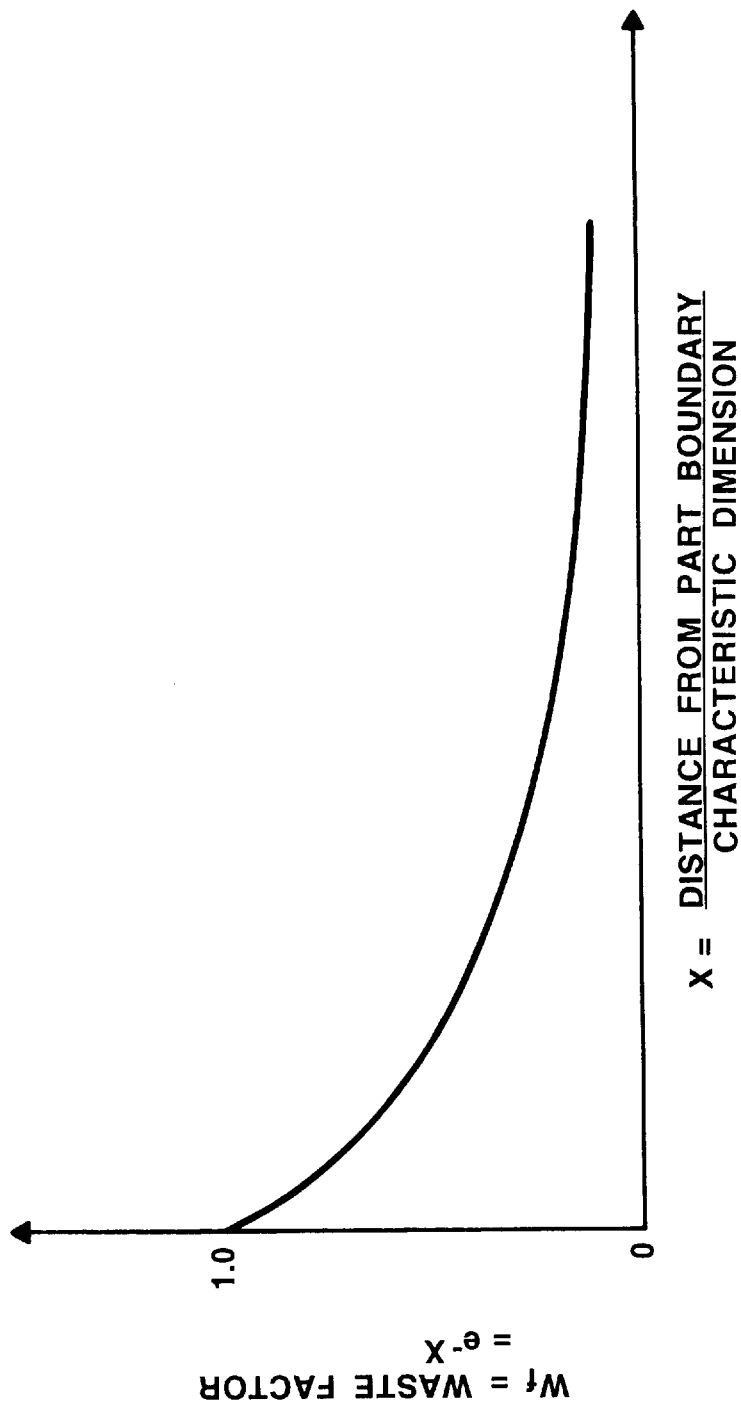
FIG. 7C is an example of a waste factor function.

As shown in FIG. 7C, one waste evaluation function or factor which may be applied to each of the area elements 150, 152, 156 (FIG. 7A) may be obtained from the function $e^{-x}$. It should be noted that in FIG. 7C the distance from a part boundary has been normalized by a characteristic part size to maintain uniformity of the function regardless of the actual part sizes. It should also be noted that the characteristic part size can be obtained in one of several ways.

One possible method of selecting a characteristic part size is to equate the characteristic part size to a value corresponding to the square root of the average of the areas of the parts. Another possible method is to select the perimeter of the part as the characteristic part size, yet another possible method is to simply select the largest dimension of the part as the characteristic part size. A maximum penalty of one (1.0) is attributed to the elements next to the boundary of part B. The function approaches a value of zero asymptotically since a small effect on the boundary can be assumed to be felt even at large distances from it.

A linearly decreasing penalty function would have a value of zero at a particular distance from a part. The choice of this distance would have to be arbitrary. To avoid this approach, a function that approaches a value of zero asymptotically is chosen. Such an evaluation has a corresponding relationship to human intuition about the choice of location 98 over locations 102 and 106 as shown earlier in FIG. 4A. The location 98 appears to create less waste between boundaries as compared to locations 102 and 106. Thus, from the candidate corner locations 98, 102 and 106 for the placement of the part 84, location 98 is chosen since it minimizes the waste calculated in the manner described above. This restricts the search to strictly N! possible layouts.

Even if the global optimum might be reachable using the corner placement strategy, restricting the placement to a single location might prevent the search from reaching that optimum. However, by choosing the location that corresponds to the minimum amount of waste, tightly packed layouts are typically produced. This allows good layouts to be produced in a relatively rapid manner.

Figure 8:
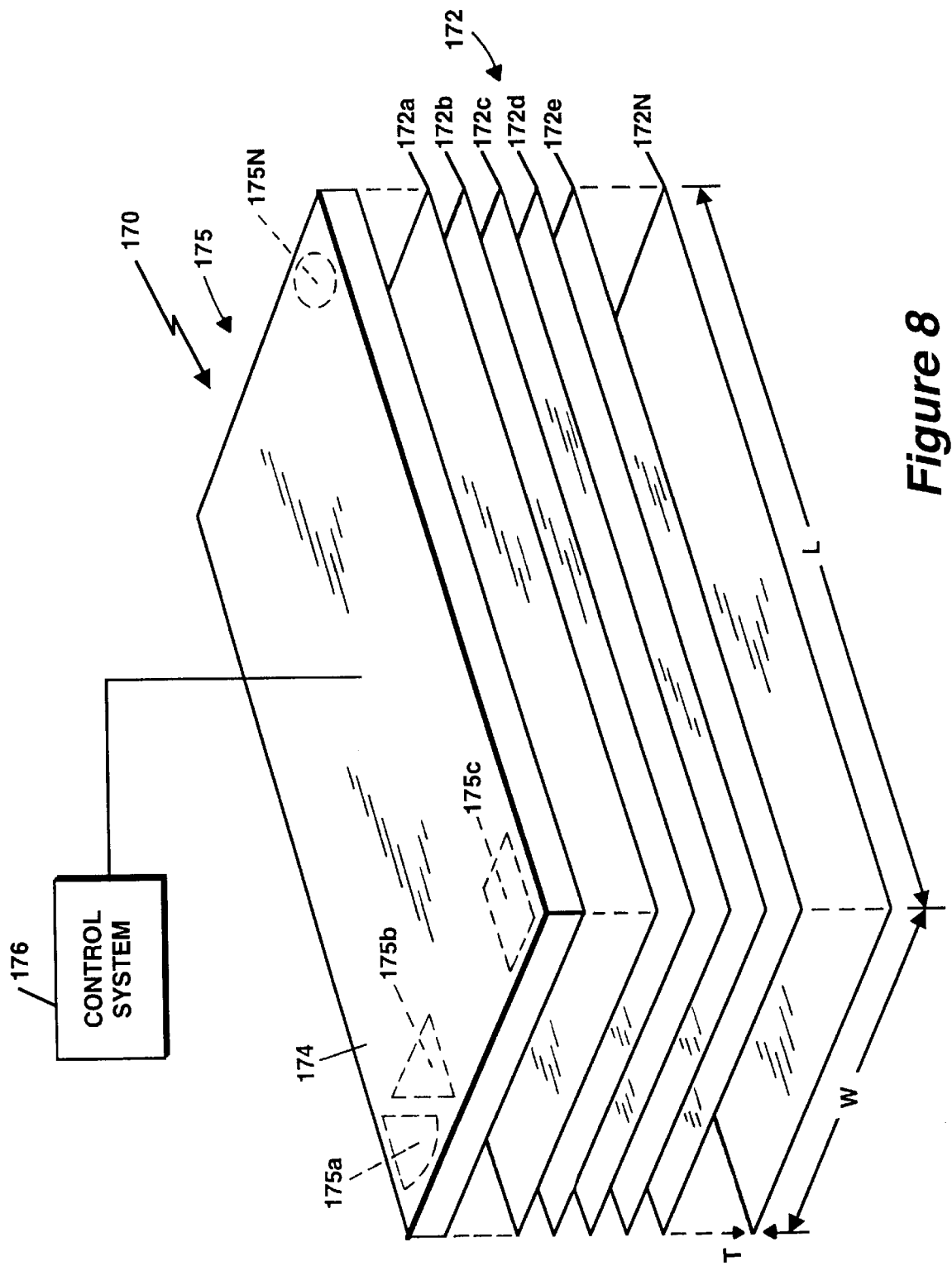
FIG. 8 is a diagram illustrating an apparatus for cutting shapes out of a plurality of sheets.

Referring now to FIG. 8, an apparatus 170 for cutting shapes out of a plurality of sheets 172a–172N generally denoted 172 includes a cutting plate 174 coupled to a control system 176. Control system, 176 includes a controller as well as means for moving cutting plate 174 to cut shapes out of sheets 172. Sheets 172 may be provided as sheets of leather or other material for example.

Once a layout is generated, each of the shapes 175a–175N generally denoted 175 in the layout may be provided on cutting plate 174 such that when machine plate 174 is pressed down against the plurality of fabric sheets 172, the shapes 175 are cut from the sheets 172. The cut pattern shapes 175 may then be placed over a frame to cover a structure such as a piece of furniture for example or may be used to form a piece of clothing for example.

Having described preferred embodiments of the invention, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

We claim:

1. A process for placing a part in a predetermined region wherein the part is defined by a corresponding part boundary and the predetermined region is defined by a region boundary, the process comprising the steps of:

(a) placing the part in a first location of the predetermined region;

(b) identifying area elements which extend from the part boundary of the part;

(c) computing the area of each of the area elements;

(d) assigning a weight value to each of the area elements, wherein each weight value is a function of a distance from a point on the part to a predetermined location of the area element;

(e) computing a first weighted sum of the area elements surrounding the part boundary in the first location of the predetermined region;

(f) placing the part in a second different location of the predetermined region;

(g) identifying area elements which extend from the part boundary of the part;

(h) computing the area of each of the area elements;

(i) assigning a weight value to each of the area elements, wherein each weight value is a function of a distance from a point on the part to a predetermined location of the area element;

(j) computing a second weighted sum of the area elements surrounding the part boundary in the second different location of the predetermined region;

(k) comparing the first weighted sum to the second weighted sum; and (l) placing the part in a first one of the first and second locations of the predetermined boundary having the lowest weighted sum.

2. Claim 1 wherein:

step (a) includes the step of placing the part in the predetermined region such that at least a portion of the part boundary of the part is proximate a first portion of the region boundary;

each of the area elements have an equal area;

at least one dimension of each area element has a value which is at least one percent of a characteristic dimension of the part; and each weight value decreases with increasing distance from the point on part being placed to the predetermined location of the corresponding area element.

3. Claim 2 wherein the predetermined location of the area element corresponds to a center location of the area element.

4. Claim 3 wherein the point on the part from which the distance is measured corresponds to a point on the part boundary.

5. Claim 4 wherein the area elements have a width dimension which is equal to a length dimension.

6. Claim 4 wherein the point on the part corresponds to a vertex of the part boundary and wherein:

the area element corresponds to a cylindrical area element; and the distance from the vertex of the part to the center of the cylindrical are element is measured along a line extending from the vertex of the part through a radial center line of the cylindrical area element.

7. The process of claim 1 wherein the part is a first one of a plurality of parts, each of the plurality of parts defined by a corresponding part boundary and the process further comprises the step of:

(k) placing a second one of the plurality of parts in a first unoccupied location of the predetermined region;

(l) identifying area elements which extend from the part boundary of the second part;

(m) computing the area of each of the area elements;

(n) assigning a weight value to each of the area elements, wherein each weight value is a function of a distance from a point on the second part to a predetermined location of the area element;

(o) computing a first weighted sum of the area elements surrounding the part boundary in the first unoccupied location of the predetermined region;

(p) placing the second part in a second different unoccupied location of the predetermined region;

(q) identifying area elements which extend from the part boundary of the second part;

(r) computing the area of each of the area elements;

(s) assigning a weight value to each of the area elements, wherein each weight value is a function of a distance from a point on the second part to a predetermined location of the area element;

(t) computing a second weighted sum of the area elements surrounding the part boundary in the second different location of the predetermined region;

(u) comparing the first weighted sum to the second weighted sum; and (v) placing the second part in a first one of the first and second unoccupied locations of the predetermined boundary having the lowest weighted sum.

8. A process for placing a plurality of parts in a predetermined region wherein each of the parts is defined by a corresponding part boundary and the predetermined region is defined by a region boundary, the process comprising the steps of:

(a) placing at least a portion of the part boundary of a first one of the plurality of parts proximate a portion of the region boundary;

(b) selecting a corner location in the predetermined region; and (c) placing a second one of the plurality of parts in the corner location.

9. The process of claim 8 wherein the step of selecting the corner location comprises the step of:

(a1) identifying a part to be placed in the predetermined region;

(a2) orienting the part in a particular direction with respect to the boundaries of a predetermined region;

(a3) generating a configuration space path; and (a4) identifying one or more breakpoints in the configuration space path wherein each of the one or more breakpoints in the configuration space path corresponds to a corner location for that particular part in the predetermined region.

10. The process of claim 8 wherein the first part has a first edge and a second edge and wherein the step of placing a first one of the plurality of parts includes the steps of:

(a1) moving a first one of the first and second edges of the first part to a first one of a boundary defining a first end of the predetermined region and a boundary defining an edge of the predetermined region such that the first one of the first and second edges of the first part is juxtaposed the first one of the boundary defining a first end of the predetermined region and the boundary defining an edge of the predetermined region; and (a2) moving a second one of the first and second edges of the first part to a second one of the boundary defining a first end of the predetermined region and the boundary defining an edge of the predetermined region such that the second one of the first and second edges of the first part juxtaposed the second one of the boundary defining the first end of the predetermined region and the boundary defining an edge of the predetermined region.

11. The process of claim 10 wherein a line which is normal to a contact point between the first one of the first and second edges of the first part and the first one of the boundary defining a first end of the predetermined region and the boundary defining an edge of the predetermined boundary is not parallel to a line which is normal to the contact point between the second one of the first and second edges of the first part and the second one of the boundary defining a first end of the predetermined region and the boundary defining an edge of the predetermined boundary.

12. The process of claim 11 wherein the second part has a first edge and a second edge and wherein the step of placing the second one of the plurality of parts in the corner location includes the steps of:

(c1) moving a first one of the first and second edges of the second part to a first one of:
a boundary defining a first end of the predetermined region;
a boundary defining an edge of the predetermined region; and
an edge of the first part;
wherein the first one of the first and second edges of the second part contacts the first one of the boundary defining a first end of the predetermined region, the boundary defining an edge of the predetermined region and the edge of the first part; and (c2) moving a second one of the first and second edges of the second part to a second one of:
the boundary defining a first end of the predetermined region;
the boundary defining an edge of the predetermined region; and
an edge of the first part;
wherein the second one of the first and second edges of the second part contacts the second one of the boundary defining the first end of the predetermined region, the boundary defining an edge of the predetermined region and an edge of the first part.

13. The process of claim 12 wherein the step of positioning a second one of the plurality of parts in the corner location includes the steps of:
selecting a corner location which minimizes the size of a gap region between an edge of the first part and an edge of the second part.

14. The process of claim 13 wherein prior to the step of positioning the second one of the plurality of parts in the corner location, the process further comprises the step of computing a probability that a gap region will be occupied by one of the plurality of parts.

15. A process for placing a plurality of parts in a predetermined region having at least two predetermined boundaries, the process comprising the steps of:

(a) selecting a first corner location in the predetermined region wherein the step of selecting the first corner location includes the steps of: (1) identifying a part to be placed in the predetermined region; (2) orienting the part in a particular direction with respect to the boundaries of the predetermined region; (3) generating a configuration space path; and (4) identifying one or more break points in the configuration space path wherein each of the one or more breakpoints in the configuration space path corresponds to a corner location for that particular part in the predetermined region; and (b) positioning a first one of the plurality of parts in the first corner location;

(c) selecting a second corner location; and (d) positioning a second one of the plurality of parts in the second corner location.

16. The process of claim 15 wherein the step of selecting the corner location includes the steps of:

(a1) identifying a part to be placed in the predetermined region;

(a2) orienting the part in a particular direction with respect to the boundaries of the predetermined region;

(a3) generating a configuration space path; and (a4) identifying one or more break points in the configuration space path wherein each of the one or more break points in the configuration space path corresponds to a corner location for that particular part in the predetermined region.

17. A process for placing parts in a predetermined region having at least two predetermined boundaries, the process comprising the steps of:

(a) selecting a first corner location in the predetermined region;

(b) positioning a first one of the plurality of parts in the first corner location wherein the first one of the plurality of parts has a first edge and a second edge;

(c) selecting a second corner location; and (d) positioning a second one of the plurality of parts in the second corner location and wherein the step of selecting the first corner location includes the steps of:

(a1) moving a first one of the first and second edges of the first part to a first one of a boundary defining a first end of the predetermined region and a boundary defining an edge of the predetermined region such that the first one of the first and second edges of the first part is disposed proximate the first one of the boundary defining a first end of the predetermined region and the boundary defining an edge of the predetermined region; and (a2) moving a second one of the first and second edges of the first part to a second one of the boundary defining a first end of the predetermined region and the boundary defining an edge of the predetermined region such that the second one of the first and second edges of the first part is disposed proximate the second one of the boundary defining the first end of the predetermined region and the boundary defining an edge of the predetermined region.

18. The process of claim 17 wherein a line which is normal to the contact point between the first one of the first and second edges of the first part and the first one of the boundary defining a first end of the predetermined region and the boundary defining an edge of the predetermined boundary is not parallel to a line which is normal to the contact point between the second one of the first and second edges of the first part and the second one of the boundary defining a first end of the predetermined region and the boundary defining an edge of the predetermined boundary.

19. The process of claim 18 wherein the second part has a first edge and a second edge and wherein the step of identifying the second corner location includes the steps of:

(c1) moving a first one of the first and second edges of the second part to a first one of:

a boundary defining a first end of the predetermined region;

a boundary defining an edge of the predetermined region; and an edge of the first part;

wherein the first one of the first and second edges of the second part contacts the first one of the boundary defining a first end of the predetermined region, the boundary defining an edge of the predetermined region and the edge of the first part; and (c2) moving a second one of the first and second edges of the second part to a second one of:

the boundary defining a first end of the predetermined region;

the boundary defining an edge of the predetermined region; and an edge of the first part;

wherein the second one of the first and second edges of the second part contacts the second one of the boundary defining the first end of the predetermined region, the boundary defining an edge of the predetermined region and an edge of the first part.

20. The process of claim 19 wherein the step of positioning a second one of the plurality of parts in the second corner location includes the steps of:

selecting a corner location which minimizes the size of a gap region between an edge of the first part and an edge of the second part.

21. The process of claim 20 wherein prior to the step of positioning the second one of the plurality of parts in the second corner location, the process further comprises the step of computing a probability that a gap region will be occupied by one of the plurality of parts.

22. A process for selecting an order in which to place a plurality of parts in a region having a predetermined boundary, the process comprising the steps of:

(a) computing a probability value for each of the plurality of parts wherein each probability value is proportional to a characteristic dimension of the respective part;

(b) storing each probability value in a database; and (c) computing a first order in which to place the parts, wherein the computing step uses the probability value computed in the step of computing a probability value.

23. The process of claim 22 further comprising the step of selecting a first corner location, wherein the step of selecting a first corner location includes the steps of:

(a1) identifying a plurality of corner locations for placement of a single part;

(a2) computing a waste value for each corner location; and (a3) selecting one of the plurality of corner locations for placement of the first part.

24. The process of claim 23 further comprising the step of selecting a second corner location, wherein the step of selecting the second corner location comprises the steps of:

(c1) identifying a plurality of corner locations for placement of a single part;

(c2) computing a waste value for each corner location; and (c3) selecting one of the plurality of corner locations for placement of the first part.

25. The process of claim 22 further comprising the step of:

(d) sequentially placing the parts in the predetermined region in the first order computed in step (c).

26. The process of claim 25 wherein the step of sequentially placing the parts in the predetermined region comprises the steps of:

(d1) selecting a first corner location in the predetermined region;

(d2) positioning a first one of the plurality of parts in the first corner location;

(d3) selecting a second corner location; and (d4) positioning a second one of the plurality of parts in the second corner location.

27. The process of claim 26 wherein the step of selecting a first corner location comprises the steps of:

(a1) identifying a part to be placed in the predetermined region;

(a2) orienting the part in a particular direction with respect to the boundaries of the predetermined region (a3) generating a configuration space path; and (a4) identifying one or more break points in the configuration space path wherein each of the one or more break points in the configuration space path corresponds to a corner location for that particular part in the predetermined region.

28. The process of claim 27 further comprising the step of computing an expected length order.

29. The process of claim 28 further comprising the step of computing a second order in which to place the parts, wherein the computing step uses the probability value computed in the step of computing a probability value.

30. The process of claim 29 further comprising the step of sequentially placing the parts in the predetermined region in the second order computed in said computing step.

31. The process of claim 26 wherein the first part has a first edge and a second edge and wherein the step of identifying the first corner location includes the steps of:
(d1a1) moving a first one of the first and second edges of the first part to a first one of a boundary defining a first end of the predetermined region and a boundary defining an edge of the predetermined region such that the first one of the first and second edges of the first part contacts the first one of the boundary defining a first end of the predetermined region and the boundary defining an edge of the predetermined region; and
(d1a2) moving a second one of the first and second edges of the first part to a second one of the boundary defining a first end of the predetermined region and the boundary defining an edge of the predetermined region such that the second one of the first and second edges of the first part contacts the second one of the boundary defining the first end of the predetermined region and the boundary defining an edge of the predetermined region.

32. The process of claim 31 wherein a line which is normal to the contact point between the first one of the first and second edges of the first part and the first one of the boundary defining a first end of the predetermined region and the boundary defining an edge of the predetermined region is not parallel to a line which is normal to the contact point between the second one of the first and second edges of the first part and the second one of the boundary defining a first end of the predetermined region and the boundary defining an edge of the predetermined region.

33. The process of claim 32 wherein the second part has a first edge and a second edge and wherein the step of identifying the second corner location includes the steps of:
(d3a1) moving a first one of the first and second edges of the second part to a first one of:
a boundary defining a first end of the predetermined region;
a boundary defining an edge of the predetermined region; and
an edge of the first part such that the first one of the first and second edges of the second part contacts the first one of the boundary defining a first end of the predetermined region, the boundary defining an edge of the predetermined region and the edge of the first part; and
(d3a2) moving a second one of the first and second edges of the second part to a second one of:
the boundary defining a first end of the predetermined region;
the boundary defining an edge of the predetermined region; and
an edge of the first part such that the second one of the first and second edges of the second part contacts the second one of the boundary defining the first end of the predetermined region, the boundary defining an edge of the predetermined region and an edge of the first part.

34. The process of claim 33 wherein the step of positioning a second one of the plurality of parts in the second corner location includes the steps of:
selecting a corner location which minimizes the size of a gap region between an edge of the first part and an edge of the second part.

35. The process of claim 34 wherein prior to positioning the second one of the plurality of parts in the second corner location, the process further comprises the step of computing a probability value indicative that a gap region will be occupied by one of the plurality of parts.

36. Apparatus for placing a parts in a predetermined region having predetermined boundaries, the apparatus comprising:
(a) means for selecting a first corner location in the predetermined region;
(b) means for positioning a first one of the plurality of parts in the first corner location;
(c) means for selecting a second corner location; and
(d) means for positioning a second one of the plurality of parts in the second corner location.

37. The apparatus of claim 36 wherein the first part has a first edge and a second edge and wherein the means for identifying the first corner location comprises:
(a1) means for moving a first one of the first and second edges of the first part to a first one of a boundary defining a first end of the predetermined region and a boundary defining an edge of the predetermined region such that the first one of the first and second edges of the first part contacts the first one of the boundary defining a first end of the predetermined region and the boundary defining an edge of the predetermined region; and
(a2) means for moving a second one of the first and second edges of the first part to a second one of the boundary defining a first end of the predetermined region and the boundary defining an edge of the predetermined region such that the second one of the first and second edges of the first part contacts the second one of the boundary defining the first end of the predetermined region and the boundary defining an edge of the predetermined region.

38. The apparatus of claim 37 wherein a line which is normal to the contact point between the first one of the first and second edges of the first part and the first one of the boundary defining a first end of the predetermined region and the boundary defining an edge of the predetermined region is not parallel to a line which is normal to the contact point between the second one of the first and second edges of the first part and the second one of the boundary defining a first end of the predetermined region and the boundary defining an edge of the predetermined region.

39. The apparatus of claim 38 wherein the second part has a first edge and a second edge and wherein the means for identifying the second corner location comprises:
(c1) means for moving a first one of the first and second edges of the second part to a first one of:
a boundary defining a first end of the predetermined region;
a boundary defining an edge of the predetermined region; and
an edge of the first part such that the first one of the first and second edges of the second part contacts the first one of the boundary defining a first end of the predetermined region, the boundary defining an edge of the predetermined region and the edge of the first part; and (c2) means for moving a second one of the first and second edges of the second part to a second one of:
the boundary defining a first end of the predetermined region;
the boundary defining an edge of the predetermined region; and
an edge of the first part such that the second one of the first and second edges of the second part contacts the second one of the boundary defining the first end of the predetermined region, the boundary defining an edge of the predetermined region and an edge of the first part.

40. Apparatus for selecting an order in which to place a plurality of parts in a region having a predetermined boundary, the apparatus comprising:
   (a) means for computing a probability value for each of the plurality of parts wherein each probability value is proportional to a characteristic dimension of the respective part;
   (b) means for storing each probability value in a database; and
   (c) means for computing a first order in which to place the parts, wherein the computing step uses the probability value computed in the step of computing a probability value.

41. The apparatus of claim 40 wherein the means for computing an order includes means for performing a roulette wheel selection.

42. The apparatus of claim 41 further comprising means for sequentially placing the parts in the predetermined region in the first order computed by said computing means.

43. The apparatus of claim 42 wherein said means for sequentially placing the parts in the predetermined region comprises:
   means for selecting a first corner location in the predetermined region;
   means for positioning a first one of the plurality of parts in the first corner location;
   means for selecting a second corner location; and
   means for positioning a second one of the plurality of parts in the second corner location.

44. The apparatus of claim 43 wherein the first part has a first edge and a second edge and wherein the means for identifying the first corner location comprises:
   means for moving a first one of the first and second edges of the first part to a first one of a boundary defining a first end of the predetermined region and a boundary defining an edge of the predetermined region such that the first one of the first and second edges of the first part contacts the first one of the boundary defining a first end of the predetermined region and the boundary defining an edge of the predetermined region; and
   means for moving a second one of the first and second edges of the first part to a second one of the boundary defining a first end of the predetermined region and the boundary defining an edge of the predetermined region such that the second one of the first and second edges of the first part contacts the second one of the boundary defining the first end of the predetermined region and the boundary defining an edge of the predetermined region.

* * * * *

UNITED STATES PATENT AND TRADEMARK OFFICE
CERTIFICATE OF CORRECTION

PATENT NO. : 5,815,398  
DATED : September 29, 1998  
INVENTOR(S) : Dighe et al.

Page 1 of 2

It is certified that error appears in the above-identified patent and that said Letters Patent is hereby corrected as shown below:

| Column | Line(s) | | Should read |
|---|---|---|---|
| 9 | 32 | referring to again to | referring again to |
| 13 | 47 | parts to placed | parts to be placed |
| 16 | 41 | are | area |
| 16 | 48 | (k) | (m) |
| 16 | 50 | (l) | (n) |
| 16 | 52 | (m) | (o) |
| 16 | 53 | (n) | (p) |
| 16 | 58 | (o) | (q) |
| 16 | 61 | (p) | (r) |
| 16 | 63 | (q) | (s) |

UNITED STATES PATENT AND TRADEMARK OFFICE
CERTIFICATE OF CORRECTION

PATENT NO. : 5,815,398
DATED : September 29, 1998
INVENTOR(S) : Dighe et al.

It is certified that error appears in the above-identified patent and that said Letters Patent is hereby corrected as shown below:

| Column | Line(s) | | Should read |
|---|---|---|---|
| 16 | 65 | (r) | (t) |
| 16 | 66 | (s) | (u) |
| 17 | 3 | (t) | (v) |
| 17 | 6 | (u) | (w) |
| 17 | 8 | (v) | (x) |

Signed and Sealed this

Twenty-third Day of March, 1999

Attest:

Q. TODD DICKINSON

Attesting Officer

Acting Commissioner of Patents and Trademarks